US011452059B2

(12) United States Patent
Do et al.

(10) Patent No.: US 11,452,059 B2
(45) Date of Patent: Sep. 20, 2022

(54) WIRELESS DEVICE LOCATION

(71) Applicant: QUALCOMM Incorporated, San Diego, CA (US)

(72) Inventors: Ju-Yong Do, Cupertino, CA (US); Sai Pradeep Venkatraman, Santa Clara, CA (US); Weihua Gao, San Jose, CA (US); Meghna Agrawal, Sunnyvale, CA (US); Gengsheng Zhang, Cuppertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/031,045

(22) Filed: Sep. 24, 2020

(65) Prior Publication Data
US 2021/0185630 A1    Jun. 17, 2021

Related U.S. Application Data

(62) Division of application No. 15/271,112, filed on Sep. 20, 2016, now Pat. No. 10,827,450.

(51) Int. Cl.
*H04W 4/02* (2018.01)
*H04W 60/04* (2009.01)
(Continued)

(52) U.S. Cl.
CPC ......... *H04W 60/04* (2013.01); *H04L 12/2809* (2013.01); *H04W 4/02* (2013.01);
(Continued)

(58) Field of Classification Search
CPC ....... H04W 60/04; H04W 60/00; H04W 4/20; H04W 4/02; H04W 4/029; H04W 4/025;
(Continued)

(56) References Cited

U.S. PATENT DOCUMENTS 6,640,184 B1 * 10/2003 Rabe .................... H04W 4/029
455/457
2004/0083210 A1 * 4/2004 Ochiai ................... H04L 61/15
(Continued)

FOREIGN PATENT DOCUMENTS

KR    101161097 B1    6/2012
WO    2012094520 A2   7/2012

OTHER PUBLICATIONS

International Preliminary Report on Patentability—PCT/US2017/047344, The International Bureau of WIPO—Geneva, Switzerland, dated Apr. 4, 2019.

(Continued)

*Primary Examiner* — Marcus Hammonds
(74) *Attorney, Agent, or Firm* — Thien T. Nguyen

(57) ABSTRACT

A system includes: an interface; and a processor configured to: receive one or more search criteria from the interface, the one or more search criteria being a first portion of a search query; determine a second portion of the search query based on the first portion of the search query and an association of the first portion of the search query with an entity, the search query being a request for a location of a target device associated with the entity; cause a transceiver of the interface to transmit the search query wirelessly in one or more outbound electronic signals to a first intermediate device; receive one or more inbound electronic signals from the first intermediate device via the interface, the one or more inbound electronic signals including a location of the target device; and cause the interface to provide an indication of the location of the target device.

22 Claims, 11 Drawing Sheets

(51) Int. Cl.
  *H04W 12/08* (2021.01)
  *H04W 4/029* (2018.01)
  *H04W 4/20* (2018.01)
  *H04L 12/28* (2006.01)
  *H04W 60/00* (2009.01)
  *H04W 12/63* (2021.01)

(52) U.S. Cl.
  CPC .......... *H04W 4/025* (2013.01); *H04W 4/029* (2018.02); *H04W 4/20* (2013.01); *H04W 12/08* (2013.01); *H04W 60/00* (2013.01); *H04W 12/63* (2021.01)

(58) Field of Classification Search
  CPC .... H04W 12/08; H04W 12/63; H04L 12/2809
  See application file for complete search history.

(56) References Cited

U.S. PATENT DOCUMENTS

| | | |
|---|---|---|
| 2004/0217859 A1 | 11/2004 | Pucci et al. |
| 2005/0099293 A1 | 5/2005 | Tyroler |
| 2008/0186162 A1 | 8/2008 | Rajan et al. |
| 2010/0302032 A1 | 12/2010 | Abed |
| 2012/0089713 A1 | 4/2012 | Carriere |
| 2012/0096019 A1 | 4/2012 | Manickam et al. |
| 2014/0108943 A1* | 4/2014 | Lee .................. H04W 4/18 715/738 |
| 2014/0244834 A1 | 8/2014 | Guedalia et al. |
| 2014/0344269 A1 | 11/2014 | Dong et al. |
| 2015/0185311 A1 | 7/2015 | Lohier et al. |
| 2016/0004871 A1 | 1/2016 | Guedalia et al. |
| 2016/0036764 A1* | 2/2016 | Dong .................. H04L 61/6022 370/254 |
| 2016/0065653 A1 | 3/2016 | Chen et al. |
| 2016/0127209 A1 | 5/2016 | Singh et al. |
| 2016/0241994 A1 | 8/2016 | Iguchi et al. |
| 2016/0241998 A1 | 8/2016 | Choi et al. |
| 2017/0038218 A1 | 2/2017 | Kamata |
| 2017/0295468 A1* | 10/2017 | Snyder .................. H04W 4/025 |
| 2018/0084517 A1 | 3/2018 | Do et al. |
| 2021/0045082 A1 | 2/2021 | Do et al. |

OTHER PUBLICATIONS

International Search Report and Written Opinion—PCT/US2017/047344—ISA/EPO—dated Jan. 29, 2018.
Partial International Search Report—PCT/US2017/047344—ISA/EPO—dated Oct. 30, 2017.
Pedersen M.V., et al., "Introduction to Bluetooth Corrmunication on Mobile Devices" In: "Mobile Peer to Peer (P2P)", Jun. 19, 2009, John Wiley & Sons, Ltd, Chichester, UK, XP055416693, ISBN: 978-0-470-69992-8, pp. 41-58, DOI 10.1002/9780470747889.ch4.

* cited by examiner

| Attribute | Device type | Device name/ID | Mobility | First position | First Pos Unc | Second position | Second Pos Unc | Second angle of arrival |
|---|---|---|---|---|---|---|---|---|
| Value | Refrigerator | Frigid | Stationary | ENU=[0, 0, 0] m | 0 m | 2.3 m | 0.1 m | 43° |
| Public (0) / private (1) | 0 | 0 | 0 | 0 | 0 | 0 | 0 | 0 |

FIG. 4

| Attribute | Device type | Device name/ID | Mobility | First position | First Pos Unc |
|---|---|---|---|---|---|
| Value | Mobile phone | Eldest child's phone | Mobile | LLA = [37.8°, -122.4°, 80m] | 200 m |
| Public (0), private (1) | 0 | 0 | 0 | 1 | 1 |

FIG. 5

| Device | Device ID | Attributes | Neighbor list | Communication history | Location history | Range history | Entity |
|---|---|---|---|---|---|---|---|
| Tablet | 1234 | [set1, time1]<br>[set2, time2] | [list1, time3]<br>[list2, time4]<br>[list3, time5] | [device1, time6]<br>[device2, time7]<br>[device3, time8]<br>[device4, time9] | [loc1, time10]<br>[loc2, time11] | [r1, ref5, t12]<br>[r2, ref6, t12]<br>[r3, ref7, t13]<br>[r4, ref5, t13] | Weihua |
| TV | | ... | ... | ... | ... | ... | ... |

WIRELESS DEVICE LOCATION

CROSS-REFERENCE TO RELATED APPLICATION

This application is a divisional application of application Ser. No. 15/271,112, filed Sep. 20, 2016, entitled "WIRELESS DEVICE REGISTRATION," assigned to the assignee hereof and the entire contents of which are hereby incorporated herein by reference.

BACKGROUND

Devices, both mobile and static, are increasingly equipped to wirelessly communicate with other devices and/or to take measurements from which their locations may be determined and/or locations may be determined of other devices from which one or more signals are received. Locations of devices may be determined by the devices themselves, or by another device that is provided with the measurements, or by another device that takes the measurements. For example, a device may determine its own location based on satellite positioning system (SPS) signals, cellular network signals, and/or Wi-Fi signals, etc. that the devices receive. Also or alternatively, the location of a target device may be determined by another to which measurements taken by the target device are provided. Also or alternatively, the location of the target device may be determined by location-determining device based on measurements of signals sent by the target device (received by the location-determining device and/or received by one or more other devices). The types of devices that are capable of wirelessly communicating continue to expand, for example with household items such as garage door openers often capable of wirelessly communicating with other devices.

To improve the usefulness of communications between devices, e.g., for locating one or more of the devices, the devices may be registered to provide information about the devices being registered. Further, the registration device or another device may be used to search for a device in the communication system.

SUMMARY

An example of a method of registering a target device includes: receiving a registration request, through a user interface, to register the target device; determining a suggested registration location for the target device; and providing an indication of the suggested registration location through the user interface.

An example of a device includes: a user interface; a processor communicatively coupled to the user interface, the processor being configured to: receive a registration request through the user interface; determine a suggested registration location for the device; and cause the user interface to provide an indication of the suggested registration location.

Another example of a device includes: a user interface; means for receiving a registration request through the user interface; means for determining a suggested registration location for the device; and means for providing an indication of the suggested registration location through the user interface.

An example of a non-transitory storage medium stores processor-readable instructions configured to cause a processor to: receive a registration request through a user interface, the registration request being for a target device; determine a suggested registration location for the target device; and cause the user interface to provide an indication of the suggested registration location.

An example of a method of assisting a user of a user device includes: receiving a first portion of a search query through a user interface of the user device; determining a second portion of the search query based on the first portion of the search query and an association of the first portion of the search query with an entity, wherein the search query is for locating a target device associated with the entity; transmitting the search query wirelessly in one or more outbound electronic signals to a first intermediate device; receiving an inbound electronic signal wirelessly from the first intermediate device, the inbound electronic signal indicating a location of the target device; and providing an indication of the location of the target device through the user interface.

An example of a system includes: a transceiver; a user interface; and a processor communicatively coupled to the transceiver and to the user interface, the processor being configured to: cause the user interface to provide a prompt for one or more search criteria, the one or more search criteria being a first portion of a search query; determine a second portion of the search query based on the first portion of the search query and an association of the first portion of the search query with an entity, wherein the search query is a request for a location of a target device associated with the entity; cause the transceiver to transmit the search query wirelessly in one or more outbound electronic signals to a first intermediate device and to a second intermediate device; receive an inbound electronic signal wirelessly from the first intermediate device, the inbound electronic signal indicating a location of the target device; and cause the user interface to provide an indication of the location of the target device.

BRIEF DESCRIPTION OF THE DRAWINGS

FIGS. 4-5 are examples of tables of device attributes corresponding one or more wireless communication devices.

FIG. 7 is a table of device data history maintained by the central controller shown in FIG. 6.

DETAILED DESCRIPTION

Figure 1:
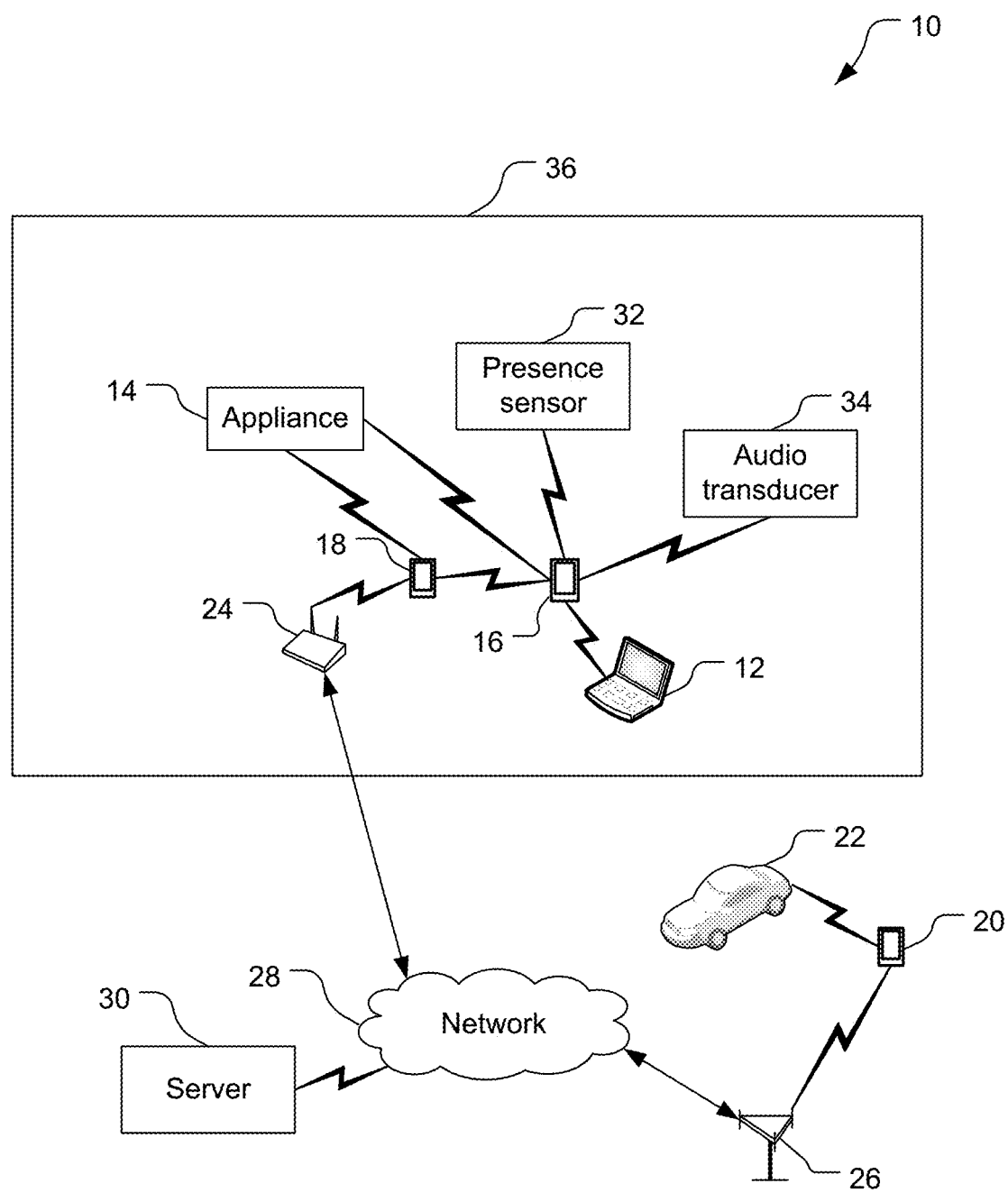
FIG. 1 is a simplified view of a wireless communication system.

Techniques are discussed herein for registering devices in wireless communication systems. For example, a user interface may help a user register devices for a wireless communication network. The user interface may provide a map so that the user may select a location on the map as the location of a device being registered. The user interface may suggest a location and/or a name for a device being registered. The suggested location may be based on a present location of the device being registered, a present location of the user interface, location input provided by a user through the user interface, a device name of the device being registered, and/or a device type of the device being registered. The user interface may suggest a device name for the device being registered, for example based on a present location of the device being registered, a name of the user, a name or title of a person associated with another device that is or has been in close proximity to the device being registered (e.g., for a threshold amount of time, possibly while the other device and the device being registered where moving). These examples, however, are not exhaustive.

Techniques are also discussed herein for finding devices in wireless communication systems, in particular a user interface for facilitating formulation of a search query to identify a device to be found, and/or for providing detailed information regarding a location of a found device. For example, a user may provide part of a search query and the user interface may provide another part of the search query based on the part provided by the user and an association of the part provided by the user and an entity. For example, the user interface may complete the search with a name of a device based on an association of a voice of the user with the user or an association of the device of which the user interface is a part and the user. As another example, the user interface may provide a map, e.g., of an interior of a building (e.g., a floor plan), and provide a visual indication of the location of a found device. As another example, the user interface may provide the location of a found device as a distance (and possibly direction) relative to another device and/or relative to a fixed location such as a reference point of a floor of a building. These examples, however, are not exhaustive.

Techniques are also discussed herein for communicating device attributes between devices in wireless communication networks. For example, a device may broadcast attributes of itself such as the type of device that it is (e.g., a mobile phone, a television, a refrigerator, etc.), the name of the device, whether the device is static (at least expectedly) or mobile (at least expectedly), the position of the device, etc. The device may provide one or more privacy indications associated with one or more respective attributes. A privacy indication may indicate, for example, whether a device receiving the broadcast of the attributes is permitted to forward or otherwise send or retransmit an indication of the attribute. As another example, a privacy indication may indicate whether a device is discoverable, e.g., whether a location of the device is allowed to be reported, or whether one or more other devices are authorized to determine the location of the device. For example, a device may not include a location of the device in a network table of device, locations, and attributes. Further, a first device may require authorization of a second device before the first device will provide a location of the first device. The authorization may be obtained by an exchange of security questions. Alternatively, the first device may provide the location of the first device in an encrypted message that the second device can only properly decrypt if the second device has an appropriate (authorized) cryptographic key. Alternatively still, if the authorization is unknown/unidentifiable, then the first device may use spoofing to obstruct knowledge of the location of the first device. The spoofing may be to add error to the first device's location, e.g., by adding error to a timing signal transmitted by the firs device, by adjusting a power level of a transmitted signal to alter a proximity determination, and/or by reporting an inaccurate location (e.g., a truthful location plus an error, e.g., of 100 m). As still another example, what attributes of a device are included in a set of attributes and/or what attributes (or attribute values) are transmitted by the device may vary, e.g., based on location of the device, or day of week, or time of day, or combinations of these and/or one or more other criteria. These examples, however, are not exhaustive.

Items and/or techniques described herein may provide one or more of the following capabilities, as well as other capabilities not mentioned. Notices can be provided in response to a expectedly static device moving or being moved. Device position determination may be improved, for example, by weighting measurements of signals from expectedly static devices more than measurements of signals from expectedly mobile devices, or even by discarding or not making the latter measurements. Device attributes may be selectively transmitted to other devices, permitting concealing of sensitive information in untrusted environments, and permitting selective dissemination of information based on expected audience. Other capabilities may be provided and not every implementation according to the disclosure must provide any, let alone all, of the capabilities discussed.

Referring to FIG. 1, a wireless communication system 10 includes wireless communication devices 12, 14, 16, 18, 20, 22, an access point 24, a base station 26, a network 28, a server 30, a presence sensor 32, and an audio transducer 34. The devices 12, 14, 16, 18, the access point 24, the presence sensor 32, and the audio transducer 34 are disposed inside a structure 36 (e.g., a building) The system 10 is a communication system in that components of the system 10 can communicate with one another directly or indirectly, e.g., via the network 28 and/or the access point 24 and/or the base station 26 (or other access points and/or other bases stations not shown). The system 10 is a wireless communication system in that at least some of the components of the system 10 can communicate with one another wirelessly. For example, the base station 26 and the device 20 may communicate wirelessly using signals according to one or more protocols such as LTE, GSM, CDMA, or OFDM. The single access point 24 and the single base station 26 are examples only, and other quantities of access points and/or base stations may be used. Also, the types of the devices 12, 14, 16, 18, 20, 22 (e.g., an appliance, a smart phone, a tablet computer, a laptop computer, and a car) are examples and other types of devices may be used, whether currently existing or developed in the future. The term "base station" does not limit the base station 26 to any particular form, protocol, etc. For example, any of the base station 26 (and/or other base stations not shown) may be referred to as a base transceiver station (BTS), an access node (AN), a Node B, an evolved Node B (eNB), etc. Further, the device 22 is a car and while the primary function of a car is not as a communication device, the car will comprise a communication device as a part of the car, and for simplicity of the disclosure the car is considered as one type of communication device herein.

The system 10 comprises an Internet of Things (IoT) network in this example, with the devices 12, 14, 16, 18, 20, 22 configured to communicate with each other, particularly through one or more short-range wireless communication techniques. The system 10 being an IoT network is, however, an example and not required. Examples of short-range wireless communication techniques include BLUETOOTH communications, BLUETOOTH Low-Energy communications, and Wi-Fi communications. The devices 12, 14, 16, 18, 20, 22 may broadcast information, and/or may relay information from one of the devices 12, 14, 16, 18, 20, 22 to another or to another device such as the access point 24 and/or the base station 26. One or more of the devices 12, 14, 16, 18, 20, 22 may include multiple types of radios, e.g., a BLUETOOTH radio, a Wi-Fi radio, a cellular radio (e.g., LTE, CDMA, 3G, 4G, etc.), etc. such that information may be received using one radio and transmitted using a different radio. Further, one or more of the devices 12, 14, 16, 18, 20, 22 may be configured to determine range to another of the devices 12, 14, 16, 18, 20, 22 (e.g., using round-trip time (RTT), or observed time difference of arrival (OTDOA), or received signal strength indications (RSSI), or one or more other techniques, or a combination of one or more of any of these techniques) and/or to determine angle of arrival (AOA) of a signal from another of the devices 12, 14, 16, 18, 20, 22 and/or from one or more other devices such as the access point 24 and/or the base station 26.

Figure 2:
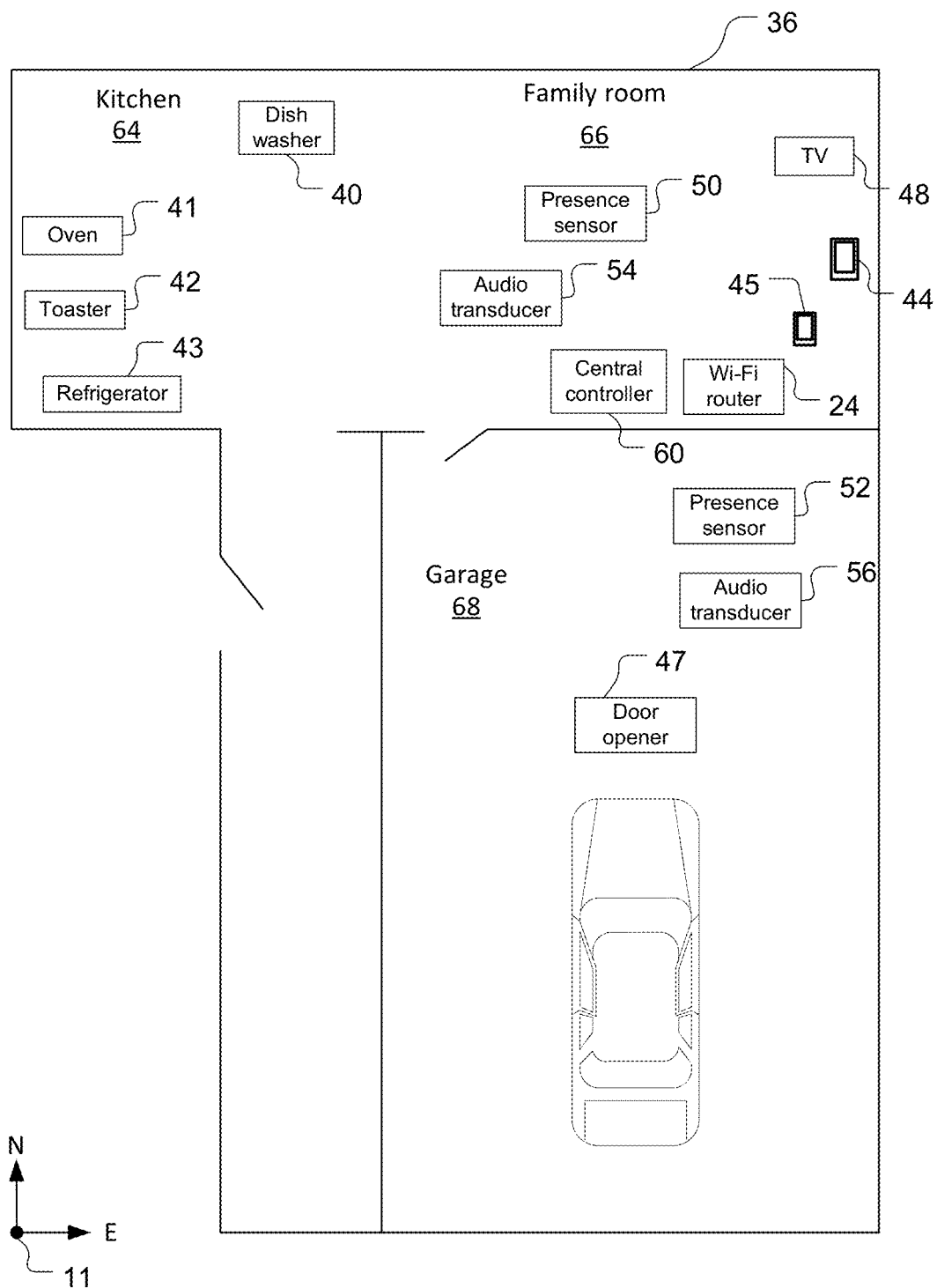
FIG. 2 is a simplified top view of an indoor portion of the wireless communication system shown in FIG. 1.

Referring to FIG. 2, and indoor portion of the system 10 inside of the structure 36 includes wireless communication devices 40, 41, 42, 43, 44, 45, 46, 47, presence sensors 50, 52, audio transducers 54, 56, a central controller 60, and the access point 24 (here a Wi-Fi router). In this example, the wireless communication devices 40-47 include a dishwasher 40, an oven 41, a toaster 42, and a refrigerator 43 disposed in a kitchen 64, a tablet 44, a smart phone 45, and a television disposed in a family room 66, and a car 46 and a garage door opener 47 disposed in a garage 68. These devices 40-47 are configured to communicate with each other if within communication range of each other, and to communicate with the presence sensors 50, 52 and the central controller 60. Using the communication capabilities between each other, information regarding the devices 40-47 may be sent to each other, relayed to other devices, or even relayed to the central controller 60. Further, communications from the central controller 60 may be received by, or forwarded by, the devices 40-47. Further still, the central controller 60 may be a standalone device as shown in FIG. 2 or may be incorporated into any of the devices 40-47. The system 10, in this example, provides an IoT network that can generate, send, receive, relay or forward, various information (e.g., attributes, attribute tables, information relating to attributes, signal measurements, location indications, etc.) to facilitate functionality described herein. The devices 40-47 are examples only, and other types of devices, as well as other quantities of devices, may be used.

The presence sensors 50, 52 facilitate detection of the presence of devices and/or users. The presence sensors 50, 52 may detect the presence of devices and/or persons in any of a variety of ways. For example, either or both of the presence sensors 50, 52 may comprise a movement sensor, e.g., that sends signals, measures their reflections, and compares present reflections with previous reflections. The signals may be visible or non-visible (e.g., infrared) light signals and audible or non-audible (e.g., ultrasound) sound signals. Either or both of the presence sensors 50, 52 may comprise a heat sensor, e.g., including an infrared sensor. Either or both of the presence sensors 50, 52 may be communicatively coupled (e.g., hard-wired or wirelessly in communication with) one or more of the devices 40-47 and/or the central controller 60. The presence sensors 50, 52 are configured to report the detection of presence (possibly only if new, or possibly new and ongoing) of a relevant object such as a person.

The audio transducers 54, 56 facilitate the reception and provision of commands from users to the central controller 60 or other appropriate device. The audio transducers are preferably communicatively coupled (e.g., hard-wired or in wireless communication with) the central controller 60 and are configured to receive verbal commands, convert these commands to electrical signals, and send the signals to the central controller 60 or other appropriate device. The audio transducers 54, 56 may send the signals to the central controller 60 or other appropriate device directly or indirectly (e.g., through one or more intermediate devices that relay the signals) such as one or more of the devices 40-47.

Figure 3:
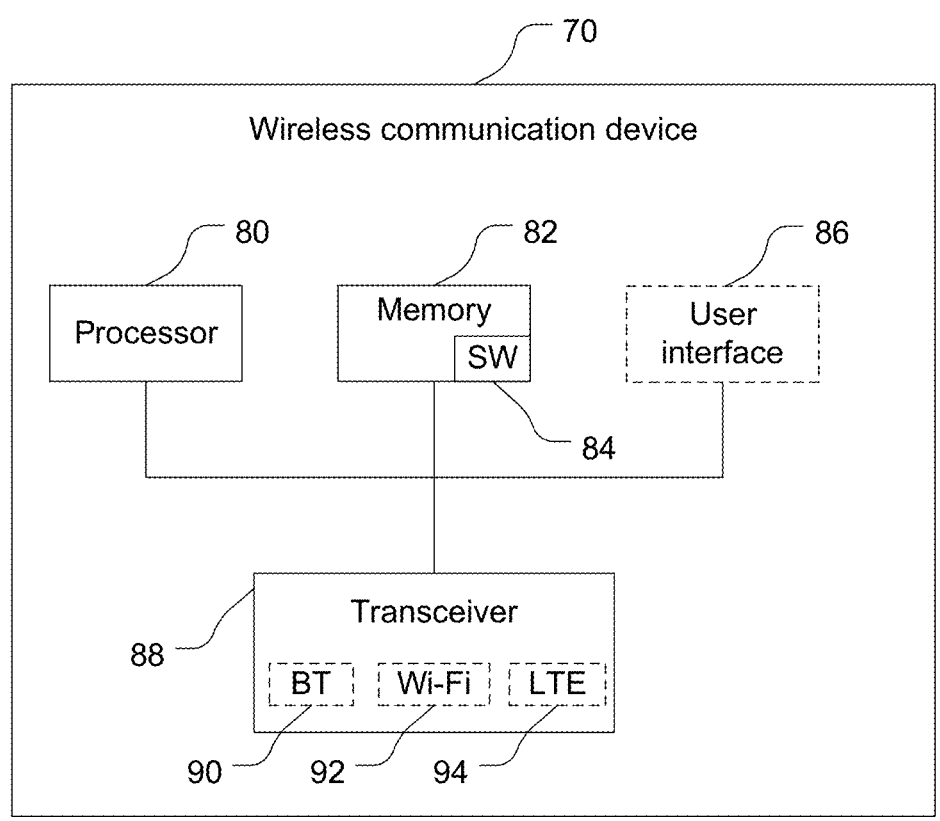
FIG. 3 is a block diagram of components of communication device shown in FIG. 2.

Referring to FIG. 3, with further reference to FIG. 1, an example wireless communication device 70 comprises a computer system including a processor 80, a memory 82 including software (SW) 84, an optional user interface 86, and a transceiver 88. The processor 80 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 80 may comprise multiple separate physical entities that can be distributed in the device 70. The memory 82 may include random access memory (RAM) and/or read-only memory (ROM). The memory 82 is a non-transitory, processor-readable storage medium that stores the software 84 which is processor-readable, processor-executable software code containing instructions that are configured to, when performed, cause the processor 80 to perform various functions described herein. The description may refer only to the processor 80 or the device 70 performing the functions, but this includes other implementations such as where the processor 80 executes software and/or firmware. The software 84 may not be directly executable by the processor 80 and instead may be configured to, for example when compiled and executed, cause the processor 80 to perform the functions. Whether needing compiling or not, the software 84 contains the instructions to cause the processor 80 to perform the functions. The processor 80 is communicatively coupled to the memory 82. The processor 80 in combination with the memory 82, the user interface 86 (as appropriate), and/or the transceiver 88 provide means for performing functions as described herein, for example, means for generating communications with device attributes and causing the transceiver 88 to transmit these communications wirelessly from the device 70, means for receiving communications from other devices, means for transmitting communications to other devices including relaying at least portions of received communications (e.g., forwarding/sending portions of received communications), and means for determining various information such as position of the device 70, relative distance from the device 70 to another device, angle of arrival of a signal at the device 70, a change in position of another device with a mobility status of "static," etc. The software 84 can be loaded onto the memory 82 by being downloaded via a network connection, uploaded from a disk, etc. The device 70 may be any of the wireless communication devices 40-47 shown in FIG. 2, or another device. The term "wireless communication device" does not require, as is apparent from the wireless communication devices 40-47, that the functionality of the device be exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication. The user interface 86 (e.g., a display and/or a microphone and speaker) is optional, e.g., with the tablet 44 and the smart phone 45 including a display, a microphone, and a speaker while the garage door opener 47 does not (typically) include a display, a microphone, or a speaker, although the garage door opener 47 may include a user interface of some sort, e.g., switches operable by a user.

The transceiver 88 is configured to send communications wirelessly from the device 70 and to receive wireless communications into the device 70, e.g., from the wireless communication devices 40-47, the access point 24, or the central controller 60. Thus, the transceiver 88 includes one or more wireless communication radios. In the example shown in FIG. 3, the transceiver 88 optionally includes a BLUETOOTH radio 90, a Wi-Fi radio 92, and a long-term evolution (LTE) radio 94. As shown, each of the radios 90, 92, 94 are optional, although the transceiver 88 will include at least one wireless communication radio. Further, one or more other types of radios may be included in the device 70 in addition to, or instead of, the radio(s) 90, 92, 94. If the transceiver 88 includes more than one wireless communication radio, then the transceiver 88 may receive a wireless communication using one of the wireless communication radios, and transmit (e.g., relay or forward), the communication (or a portion thereof) using a different wireless communication radio. The communication may be transmitted to another of the wireless communication devices 40-47 or to another device such as the access point 24. Thus, for example, the device 70 may receive a wireless communication using the BLUETOOTH radio 90, and forward the communication using the Wi-Fi radio 92 to another device that does not include a BLUETOOTH radio.

The processor 80 is configured to relay communications between devices, for example, from the central controller 60 the devices 40-47 or from the devices 40-47 to the central controller. For example, the processor 80 may receive, via the transceiver 88, the request from the central controller 60 (directly or indirectly, e.g., from another of the devices 40-47) for the location of one of the devices 40-47. The processor 80 may relay the request to one or more of the devices 40-47 within communication range of the device 70. The processor 80 is further configured to relay a reply from any of the devices 40-47 to the central controller 60, or to another device for further relay until the reply reaches the central controller 60. The reply, for example, may be a location of a target device, and the location may be a distance relative to another device, for example from the device from which the reply is received.

The processor 80 is configured to generate, store (via the memory 82), modify, and transmit (via the transceiver 88) device attribute values corresponding to the device 70. The processor 80 may determine and update the attributes, e.g., each time the processor 80 detects a possible change in an attribute (e.g., range and/or AOA to another device, position of itself, a new device within communication range, etc.). The device attributes and their respective values stored by any particular device will typically vary depending on that device. For example, referring also to FIG. 4, the processor 80 may generate and maintain an attribute table 110 including indications of attributes 112, values 114 of the attributes 112, and public/private status 116 indicative of whether the corresponding attribute 112 is public or private. In the example shown in FIG. 4, the attribute table 110 includes attributes of a device type 118, a device name/ID 120, a mobility 122, a first position 124, a first position uncertainty 126 (Pos Unc), a second position 128, a second position uncertainty 130, and a second angle of arrival 132. The second angle of arrival 132 is called the second, even though there is no first, angle of arrival in this example because the second angle of arrival 132 corresponds to the second position 128. In this example, the values 114 of the device type 118, the device name/ID 120, and the mobility 122 are "refrigerator," "frigid," and "stationary," respectively.

The processor 80 may store attribute values of other devices. The processor 80 may maintain tables of attributes for devices presently and/or formerly within communication range of the device 70. Thus, the processor 80 may store attribute values of other devices and not just relay the attribute values.

The processor 80 is configured to determine and provide positions of the device 70 relative to one or more reference locations or objects, and may provide the positions in one or more formats. For example, the processor 80 may generate a position relative to a fixed location in space. An example of this in the table 110 is the value of 114 of the first position 124 in ENU (East, North, up) coordinates. In this example, the value 114 of the first position 124 is "ENU equals [0 0 0] m" and is given in numbers of meters East, North, and up relative to a reference location. For example, the coordinates may be relative to an origin 11 (FIG. 2) that is even with a southernmost point of the structure 36, a westernmost point of the structure 36, and a lowest point of the structure 36 (e.g., of the entire structure 36 or a portion thereof such as a floor of the structure 36). The origin 11, as shown in FIG. 2, may be displaced from the structure 36 or from a particular floor of the structure 36. The value 114 of the first position uncertainty 126 is an indication of the uncertainty in each of the coordinates provided in the first position 124, and this example, being 0 m for each of the coordinates. As an example of another form of relative position, the processor 80 may be able to determine a distance relative to a reference location or object and an angle to that object (e.g., based on an angle of arrival of signals from that object). For example, in the table 110, the value 114 of the second position 128 is 2.3 m relative to a reference object. Further, the second position uncertainty 130 in this example is equal to 0.1 m, and the second angle of arrival 132 is equal to 43°. The angle of arrival (AOA) may be provided relative to a reference direction, for example relative to true north or to magnetic north.

The processor 80 may be configured to determine the angle of arrival 132 relative to an orientation of the device 70. The processor 80 may determine the angle of arrival using any of a variety of techniques such as by analyzing received signals at one or more directional antennas of the radios 90, 92, 94 and analyzing information from one or more orientation sensors included in the device 70 such as one or more magnetometers and/or one or more accelerometers and/or a compass (such as a digital compass). The processor 80 may be configured to analyze multiple AOA determinations, e.g., determined from signals received by more than one of the radios 90, 92, 94, and to combine the determined angles, e.g., by averaging the determined angles.

The processor 80 may be configured to determine the distance to an object using known techniques (e.g., RSSI, RTT, etc.). The processor 80 may average/sample measurements over time and/or may determine ranges using multiple different techniques and/or measurements from multiple radios to improve accuracy of position determination and to detect changes in location (at least relative to one or more neighbor devices). If the processor 80 is configured to use multiple radios to determine range, then the processor 80 may be configured to select which radio(s) to use based on an estimated distance to the object and/or an environment of the device 70. As examples, if a last known location of the object was more than 150 m, then the processor 80 may select to use the LTE radio 94, and if the object was last known to be less than 20 m away, then to use the BLUETOOTH radio 90 and the Wi-Fi radio 92. The processor 80 may update the position of the device 70 based on new measurements. Preferably, to determine the position of the device 70, the processor uses measurements from three or more stationary devices whose stationary nature and positions are exchanged/broadcast. The processor 80 may be configured to weight measurements more from devices whose mobility status is static. The processor 80 may use devices with programmed locations and/or with self-positioning capability (e.g., SPS, Wi-Fi positioning) as anchor reference objects. Based on determined relative positions to devices, and attribute values received (directly or indirectly) for these devices, the processor 80 may determine status of the devices, e.g., stationary, moved by 10 m, re-located and now stationary, etc.

The processor 80 may be configured to self monitor the position of the device 70. The processor 80 may be configured to determine a change in the position of the device 70 based on a neighboring device list, ranges to neighbors, and/or an estimated position. Measurements from devices with a mobility status of mobile may be given higher weight than normal under certain circumstances, for example, if the device has not moved in longer than a threshold amount of time.

The processor 80 may be configured to provide peer monitoring to detect changes in the location of one or more neighbor devices. For example, the processor 80 may detect and report a change in position of a particular neighboring device if the positions of a majority of the neighboring devices are constant while the relative position of the particular neighboring device changes. The processor 80 may report a change in position of a particular device if the existence of the particular neighboring device on the neighbor list changes, e.g., from being on the list to not being on the list, or from not being on the list to being on the list, while the ranges to other devices on the neighbor list remain the same.

The processor 80 is further configured to provide the public/private indications 116 indicating whether the corresponding attribute is public or private. The processor 80 is configured, in this example, to provide a value of 0 for any attribute that is to be public and a value of 1 for any attribute that is to be private. The use of 0 as an indication of an attribute being public and 1 as an indication of an attribute being private is an example only, and numerous other explicit indications of public/private status may be used. An indication that an attribute is public indicates to a device receiving the attribute table 110 that the receiving device may re-send the corresponding attribute an attribute value to a further receiving device. An indication that an attribute is private indicates to a device receiving the attribute table 110 that the receiving device may not re-send the corresponding attribute and attribute value to a further receiving device. The processor 80 is configured to receive attribute tables and to process the corresponding attributes in accordance with this public/private convention.

Alternatively, the processor 80 may generate an attribute table without the public/private indications 116. The processor 80 may generate the attribute table without explicit indications of public/private status but may still generate the attribute table with an implicit indication of public/private status for one or more of the attributes. For example, the processor 80 may generate and store the attribute table with public attributes in locations of the attribute table that are implicitly public and store private attributes in the attribute table in locations of the attribute table that are implicitly private. This technique, however, is an example only and numerous other techniques for implicit indications of public/private status may be used.

The processor 80 may be configured to process the attribute table 110 or at least one or more components thereof differently depending on the public/private status 116 of one or more of the attributes 112. For example, the processor 80 may be configured to broadcast the attribute table 110 to any device within communication range only if the public/private status 116 of all of the attributes 112 is public. In this way, non-sensitive attributes such as device type and mobility status may be broadcast to any device within communication range. For example, if the device 70 is in a geographically excluded area such as a home without a significant security risk and has a relatively short device broadcast range (e.g., short range BLUETOOTH), then the device 70 may broadcast all the attributes 112 which may provide for faster and easier set up of the device 70 than if the attribute table 110 is not broadcast. As another example, the processor 80 may be configured to broadcast only those attributes 112 whose corresponding public/private status 116 is public and to transmit the attributes 112 whose public/private status 116 is private only to devices that are credentialed and paired with the device 70. In this case, the processor 80 may be configured to transmit the entire attribute table 110 to the devices that are credentialed and paired with the device 70. In this way, sensitive attributes such as position can be protected and shared only with devices that are credentialed and paired with the device 70. For example, devices in a home network may share their respective attributes while a foreign device (e.g., and intruder's mobile phone) will not be able to access the private attributes of the devices in the home network, including the locations of the devices in the home network.

The processor 80 is further configured to process attributes received from other devices in the respective attribute tables according to the public/private status of the attributes in those tables. For example, the processor 80 preferably will not broadcast or otherwise retransmit the received values of attributes whose public/private status is private, but can rebroadcast or otherwise retransmit attributes whose public/private status is public. In this way, attributes may be relayed between devices, e.g., the devices 40-47, and provided to the central controller 60. The relaying/retransmitting of the attributes may be through the same radio and/or different radios (e.g., received via one type of radio and retransmitted using one or more other types of radios instead of or in addition to the radio through which the attributes were received). Further, the processor 80 may use information received from a transmitting device for determining the position of the device 70 but not provide information from which the position of the transmitting device may be determined if an appropriate attribute (e.g., a "device discovery permitted" attribute) transmitted by the transmitting device is indicated as being private.

The processor 80 may relay entire attribute tables received from other devices. For example, if the processor 80 receives an attribute table from a "new" device, e.g., from a device with which the processor 80 has never communicated, or at least from which the processor 80 has never received an attribute table (or possibly attributes even if not part of a table), then the processor 80 may relay (e.g., retransmit using the transceiver 88) the received attribute table. Further, the processor 80 may relay an updated attribute table from a device, e.g., if the attribute table includes a version number that indicates that the attribute table is newer than a most-recent attribute table for that device that the processor 80 has received.

Different ones of the devices 40-47 may have different priorities for relaying information such as attribute tables. For example, plugged-in devices may have higher priority than devices that are not (at least currently) plugged-in for relaying attribute tables and the devices 40-47 may communicate to reduce or eliminate redundant relaying of information. As another example, devices with more remaining battery life (e.g., current and/or estimated future life) may have higher priority for relaying information.

The device 70 may refuse an operation, such as relaying one or more attributes and/or attribute tables. The processor 80 may have a set of rules and/or criteria based upon which the processor 80 will refuse to perform one or more corresponding operations. The rules and/or criteria, and data corresponding to those rules and/or criteria may be tracked by the device 70 and/or the central controller 60. For example, the device 70 may refuse to relay an attribute table based on a battery level (existing and/or predicted) of/for the device 70. The processor 80 may be configured to send a negative acknowledgement of the operation refusal, e.g., a message indicating that the processor 80 did not or will not relay the attribute table. The processor 80 may be configured to send an indication of future operation refusal, e.g., that after a certain future time the processor 80 will not perform one or more specified functions (e.g., relaying an attribute table). The future time may be specified in any of a variety of ways such as a time of day and/or an amount of time from the present time (e.g., 10 minutes from now). The processor 80 may include an indication of a reason for the future operation refusal, e.g., that the device 70 will have an unacceptably low battery level (which could be specified, e.g., 10% or 5% of capacity).

The table 110 is an example only and more or fewer attributes may be recorded and/or transmitted by the processor 80 as part of an attribute table or independently of an attribute table. Further, other attributes than those shown in the table 110 may be included in an attribute table (e.g., in addition to or in place of one or more of the attributes shown in the table 110). For example, possible other attributes include: a list of one or more trusted devices associated with the device 70, a round-trip time associated with correspondence with another wireless communication device and a location of that device, a supported ranging protocol, a ranging uncertainty, a neighbor list indicative of access points (or other devices) neighboring the device 70, a neighbor list history, whether the device 70 may be presented on a map, and whether angle-of-arrival determinations are supported. Further, an indication may be provided as to an attribute that is not being included in an attribute table sent by the device 70 (e.g., position or altitude may be explicitly indicated as not being provided if the position or altitude has not been determined yet or the device does not have the capability to provide this information). As another example of more or fewer attributes than shown in FIG. 4 being possible, although in the table 110 there is a position uncertainty corresponding to each position, this is not required and one or more of any positions provided in any table of attributes generated by the processor 80 may have a corresponding position uncertainty or may not have a corresponding position uncertainty provided. Further, although the table 110 shows an angle of arrival associated with a position relative to an object, this is not required. The table 110 may also include an identity of an attribute for which an indication is not being transmitted by the device 70. Further, other attributes that may be included in the attribute table 110 or another attribute table, although not shown in the attribute table 110, include, for example, power consumption, power/battery status (e.g., current battery level such as remaining power amount (e.g., percent of capacity) and/or remaining time at current consumption rate, or projected battery status, or if the device is connected to wall power), activity cycle (e.g., waking schedule of when or how often a device wakes and for how long), supported wireless communication protocols (e.g., which versions of 802.11 that the device 70 supports (e.g., g, n, ac, ad)), point-of-interest location (e.g., room name, civic address, building name, store name, etc.), velocity (speed and direction), or speed. Still other attributes may be included in the table 110 such as a list of one or more trusted devices associated with the device 70, a supported ranging protocol, and a ranging uncertainty. Also or alternatively, there may be sub-attributes or tiered attributes, such as tiered locations with different levels of location specificity. For example, a point-of-interest (POI) location of the device 70 may be listed as "home" and further as "family room," or as "California," "San Diego," "Sorrento Valley," "Sorrento Valley Road," "1234 Sorrento Valley Road," and "Room 14C." Still other attributes are possible to be included in the attribute table 110 or another attribute table.

Also or alternatively, what attributes or attribute values are recorded and/or transmitted may vary based upon criteria such as time of day, day of week, day of year, location, one or more other criteria, and/or combinations of any of these. Thus, the content of the attribute table 110, or what content of the attribute table 110 is transmitted, may be dynamic. An attribute that may or may not be included in the table 110, or may or may not be transmitted by the processor 80 (via the transceiver 88) even if the attribute is included in the table 110, may be considered to be a dynamic attribute. For example, transmission of one or more attribute values may be disabled (or conversely, enabled) at certain locations, or at locations other than one or more specified locations (e.g., any location other than a user's home or other location or region), etc.

The processor 80 is configured to generate and maintain, including modifying, the attribute table 110. For example, one or more of the attributes 112 may be dynamic such that the processor 80 may update the attribute table 110. For example, the processor 80 may update the position of the device 70 intermittently (e.g., periodically), in response to a trigger such as the position of the device 70 changing more than a threshold amount, or the position of the device 70 changing at all (e.g., if the mobility value 114 of the device 70 is "stationary"). Even if the device 70 is stationary, the processor 80 may update the position of the device 70 as the position may be relative to another device that is mobile, and/or may update the table 110 to indicate the time that the position was determined (even if the position value(s) has (have) not changed). Further, many of the possible attributes determined and provided by the processor 80 may be dynamic such as power status, battery status, power consumption, velocity, speed, point-of-interest location, etc.

Further, the processor 80 may update or modify the attributes (e.g., in the attribute table 110) automatically or manually (in response to user input). As manual examples, the processor 80 may receive input from the user interface 86 and use this input to modify one or more of the attributes 112 such as the device name/ID 120 and/or the position of the device 70 (e.g., the ENU coordinates). As an automatic example, the processor 80 may be configured to determine (calculate or receive) and update the position of the device 70 (e.g., using any of a variety of techniques such as satellite positioning system (SPS), round-trip time calculation, observed time difference of arrival (OTDOA) calculation, received signal strength indication (RSSI) calculation, etc.). The processor 80 may be configured to receive a mapping of POI names and associated geographic regions, e.g., a mapping of the structure 36 shown in FIG. 2 with corresponding POI names for different regions (e.g., kitchen, family room, and garage as shown in FIG. 2). The processor 80 may determine which of the geographic locations (e.g., regions, coordinates, etc.) in the map corresponds to the location of the device 70. The processor 80 may be configured to determine the POI name based on the determined geographic location (e.g., using a look-up table of regions and POI names, or a look-up table of coordinate ranges and POI names). The processor 80 may be configured to store (e.g., initially write, or update) the POI name associated with the geographic location that corresponds to the location of the device 70, e.g., in the table 110 in the memory 82, as an indication of the location of the device 70.

The processor 80 may also, or alternatively, be configured to update the attributes (e.g., in the attribute table 110) automatically in response to receiving one or more attribute values from one or more devices within communication range of the device 70. For example, the processor 80 may receive, via the transceiver 88, one or more indications of POI location names of one or more devices within communication range of the device 70. The processor 80 may respond to receiving such indication(s) by modifying the value 114 of a POI name attribute in the table 110 to one of the received names, e.g., based on the number of devices with the same POI name, or based on the proximity of the other device(s) to the device 70, or based on mobility status of the other device(s), or one or more other criteria, or on a combination of two or more thereof. For example, the processor may change the value of the POI name attribute in the table 110 (e.g., to "family room") in response to a threshold number of received POI names from neighbor devices being "family room." As another example, the processor 80 may change the POI name in the table 110 in response to multiple devices having the same POI name and having locations relative to the device 70 within a threshold distance. As another example, the processor 80 may change the POI name in the table 110 to the POI name of a device that is within a threshold distance of the device 70. As another example, the processor may change the POI name in the table 110 to the POI name of a static device that is within a threshold distance of the device 70.

The processor 80 may also, or alternatively, be configured to transmit an alert indication in response to one or more criteria being met. For example, the processor 80 may be configured to receive an indication from another device, such as one of the devices 40-47, that the other device has a mobility status of static. The processor 80 may be configured to determine the location of the other device relative to the device 70 changes and transmit an indication that the location of the other device relative to the device 70 has changed (and possibly also that the mobility status is static). For example, the processor 80 may transmit, via the transceiver 88, an indication to the central controller 60 (directly or indirectly) that the other device, while supposed to be static, has moved. This indication, for example, maybe an alert that the other device is being stolen or otherwise improperly moved (e.g., a child moving an object that should not be moved).

As another example of location format for a location attribute, referring also to FIG. 5, the processor 80 may generate and maintain an attribute table 150 including indications of attributes 152, values 154 of the attributes 152, and public/private status 156 indicative of whether the corresponding attribute 152 is public or private. In the example shown in FIG. 5, the attribute table 150 includes attributes 152 of a device type 158, a device name/ID 160, a mobility 162, a first position 164, and a first position uncertainty 166. In this example, the values 154 of the device type 158, the device name/ID 160, and the mobility 162 are "Mobile phone," "Eldest child's phone," and "mobile," respectively. Further, the first position 164 has a value 154 that is provided in terms of latitude, longitude, and altitude (LAA). In this example, the value 154 of the first position 164 is 37.8° latitude, −122.4° longitude, and 80 m in altitude (e.g., relative to sea level). Further in this example, the public/private status 156 of the first position 164 and the first position uncertainty 166 is private. That is, the processor 80 has generated the attribute table 150 to indicate that the values 154 of the first position 164 and the first position uncertainty 166 are not to be retransmitted (e.g., rebroadcast) by any device receiving the attribute table 150.

Figure 6:
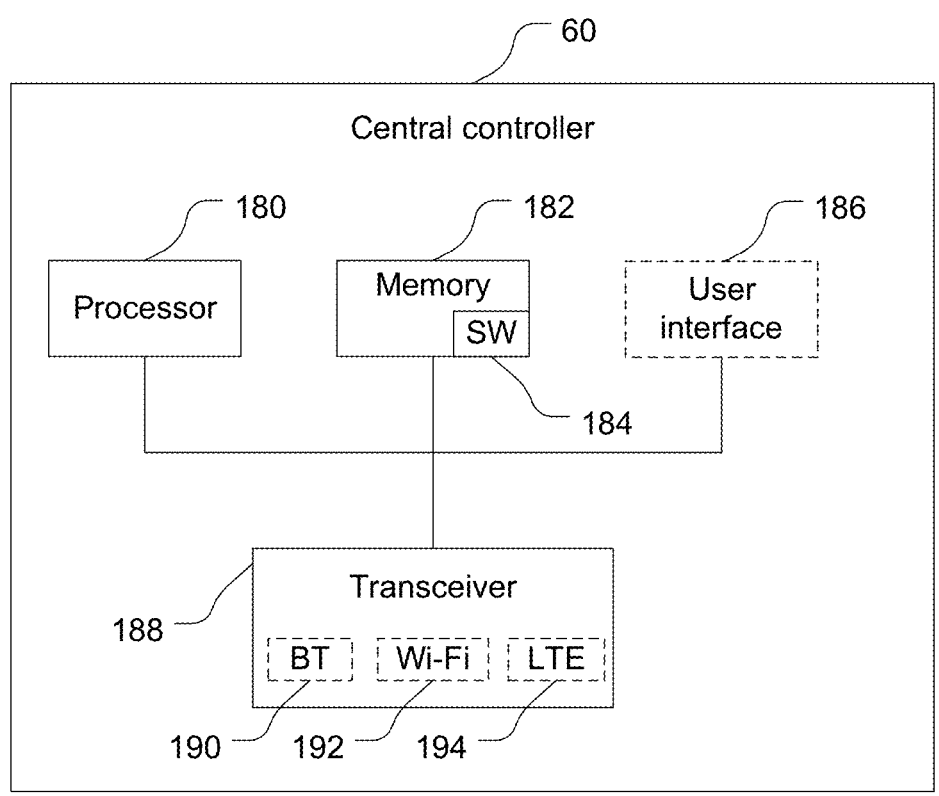
FIG. 6 is a block diagram of components of a central controller shown in FIG. 2.

Referring to FIG. 6, with further reference to FIGS. 1-2, an example of the central controller 60 comprises a computer system including a processor 180, a memory 182 including software (SW) 184, an optional user interface 186, and a transceiver 188 optionally including a BLUETOOTH (BT) radio 190, a Wi-Fi radio 192, and/or an LTE radio 194. Other types of radios may also or alternatively be used, e.g., a BLUETOOTH-Low Energy (BT-LE) radio. The processor 180 is preferably an intelligent hardware device, for example a central processing unit (CPU) such as those made or designed by QUALCOMM®, ARM®, Intel® Corporation, or AMD®, a microcontroller, an application specific integrated circuit (ASIC), etc. The processor 180 may comprise multiple separate physical entities that can be distributed in the central controller 60. The memory 182 may include random access memory (RAM) and/or read-only memory (ROM). The memory 182 is a non-transitory, processor-readable storage medium that stores the software 184 which is processor-readable, processor-executable software code containing instructions that are configured to, when performed, cause the processor 180 to perform various functions described herein. The description may refer only to the processor 180 or the central controller 60 performing the functions, but this includes other implementations such as where the processor 180 executes software and/or firmware. The software 184 may not be directly executable by the processor 180 and instead may be configured to, for example when compiled and executed, cause the processor 180 to perform the functions. Whether needing compiling or not, the software 184 contains the instructions to cause the processor 180 to perform the functions. The processor 180 is communicatively coupled to the memory 182. The processor 180 in combination with the memory 182, the user interface 86 (as appropriate), and/or the transceiver 188 provide means for performing functions as described herein, for example, means for producing a request for location of a target device, means for transmitting the request, means for determining that the target device lacks a radio compatible with a radio (or radios) of the controller 60, means for determining an intermediate device that includes a radio compatible with the target device, means for determining the last known device(s) that communicated with the target device, and/or means for transmitting the request to intermediate devices in reverse chronological order of communication with the target device. The processor 180 in combination with the memory 182, the user interface 186, and/or the transceiver 188, as appropriate, may provide means for receiving a registration request, means for determining a suggested registration location, means for providing an indication of the suggested registration location, and means for determining and/or providing a suggested device name. The software 184 can be loaded onto the memory 182 by being downloaded via a network connection, uploaded from a disk, etc. The central controller 60 is shown in FIG. 2 as a standalone device separate from the devices 40-47, but the central controller 60 could be implemented by one or more of the devices 40-47 and/or one or more other wireless communication devices such as the Wi-Fi router 24. The central controller 60 is preferably, though not necessarily, a (primarily) static device.

The central controller 60 may act as a repository for, and tracker of, information regarding the devices 40-47. For example, the central controller 60 may store config files and/or attributes of one or more of the devices 40-47, and may use this information to produce alarms. As another example, the controller 60 may track locations of one or more of the devices 40-47 and/or communication partners of one or more of the devices 40-47.

Referring also to FIG. 7, the controller 60 may store and maintain a device data history 210 in the memory 182. In this example, the device data history 210 is a table that includes a device name field 212, a device ID field, an attributes field 214, a neighbor list field 216, a communication history field 218, a location history field 220, a range history field 222, and an entity field 224. In the table 210, the location history field 220 and the range history field 222 are shown being stored separately from the attributes field 214, but this is only an example and information regarding the location history and/or the range history may be included in the attributes field 214. The information stored in the device data history 210 may be used, as discussed herein, to facilitate locating a device listed in the device field 212, contacting a device listed in the device field 212, etc. The discussion below pertains to the example where the controller 60 is configured to produce and maintain (e.g., update) the device data history 210 including the fields 212, 213, 214, 216, 218, 220, 222, 224, although the controller 60 in other examples may be configured to produce and maintain a device data history with a different set of fields (e.g., more fields, fewer fields, different fields, or a combination thereof). The controller 60 is, and in particular the transceiver 188 and the processor 180 are, configured to receive information for populating the fields 212, 213, 214, 216, 218, 220, 222, 224 of the device data history 210 from the devices 40-47. The information for the device data history 210 may be received directly from the device to which the information pertains, and/or from one or more devices that relay the information. Consequently, the controller 60 may receive information for one or more of the devices 40-47 via one or more of the radios 190, 192, 194 even though the device from which the information was originally sent does not include the type of radio in the transceiver 188 through which the controller 60 receives the information. The devices 40-47 may send information for the fields 212, 213, 214, 216, 218, 220, 222, 224 periodically, or in response to a change in the information for one or more of the fields 212, 213, 214, 216, 218, 220, 222, 224, e.g., each time a new device is paired with (communicates with) the reporting device, possibly only if the reporting device is a mobile device and/or possibly only if the paired device is a mobile device. Further, the controller 60 (or the device 70) may create an attribute entry for another device. For example, a discovering device (e.g., the controller 60 or the device 70) may see another device that is not part of an attribute table and may generate an attribute table entry (or entries) for that device, and may transmit that attribute table entry (or entries) to one or more other devices, and/or may transmit information to one or more other devices which may generate an attribute table entry (or entries) using this information. Thus, the device 70 may discover a "new" device, generate one or more attribute table entries for the new device, and send the attribute table entry (or entries), directly or indirectly, to the controller 60 for storage. Also or alternatively, the device 70 may discover a "new" device, send (directly or indirectly) information regarding the new device to the controller 60 for generation and storage of an attribute table entry (or entries).

The controller 60 is configured to populate the attributes field 214 with one or more sets of attributes for each of the devices for which information is stored. The attributes in the attributes field 214 may be one or more of the attributes provided by the devices 40-47, for example in an attribute table such as the attribute table 110 or the attribute table 150. To populate the attributes field 214 (or other appropriate field), the controller 60 is configured to add (store) data and/or to replace previously-stored data with new data. As shown in FIG. 7, the table 210 includes two sets 230, 232 of attributes for a tablet (e.g., the tablet 44). The two sets 230, 232 are stored in association with respective times, e.g., that the sets 230, 232 were reported to the controller 60. The attributes for a device may vary over time, e.g., with different mobility status, different positions, different ranges to reference points or objects, etc. A different set of attributes may be stored only if there is a change in the attributes, or may be stored, regardless of whether there are changes, each time that the attributes are received by the controller 60. The controller 60 may limit the number of sets of attributes stored in the respective attributes field 214, e.g., to a maximum number of sets, or to sets within a threshold amount of time of the present time, etc.

The controller 60 is configured to populate the neighbor list field 216 with one or more neighbor lists, if any, provided to the controller 60 from the respective device. In the example shown in FIG. 7, the neighbor list field 216 for the refrigerator includes three lists of devices seen by the refrigerator at three different times. While the lists are given unique names in the example shown in FIG. 7, multiple lists may be identical to each other.

The controller 60 is configured to populate the communication history field 218 with devices with which the respective device listed in the device field 212 has communicated. The controller 60 may limit the number of entries in the communication history field 218, e.g., to a threshold number of entries, to entries within a threshold amount of time of the present time, etc. The entries in the communication history field 218 indicate the communications of the device listed in the device field 212 with any other device(s) within the criterion (criteria) for storage in the communication history field 218. The entries in the communication history field 218 represent a time-stamped (and preferably, chronological) history of last known, by the controller 60, devices with which the device listed in the device field 212 communicated and at what respective times. The times in the communication history field 218 are times associated with corresponding communications. Each of these times may be, for example, a beginning time of most-recent communication between the device shown in the device field 212 and the device corresponding to the time in the communication history field 218, or an ending time of such a communication. One or more, e.g., each, of the entries in the communication history field 218 may include a location of the device (i.e., the communicating device) that communicated with the target device. This location may, for example, correspond to the location of the communicating device associated with the communication with the device in the device field 212 (e.g., at the indicated time of the last communication), or may correspond to a present location of the communicating device.

The controller 60 is further configured to populate the location history field 220 with sets of data regarding the location of the device listed in the device field 212 and a corresponding time. The data regarding the location of the device listed in the device field 212 may be the location itself, or may be data from which the location may be derived. The time associated with the location data is preferably the time at which data (e.g., measurements) were collected for determining the location of the respective device. The location of the device, as discussed herein, may be a location relative to a reference point (e.g. a corner of the building), another object, a global reference, etc.

The central controller 60 is further configured to populate the range history field 222 with sets of information each indicating a range, a respective reference, and a respective time. The respective reference may be a reference point, a reference object, a reference device, etc. Multiple ranges to different references may be determined (or at least listed as being determined) at the same time or a similar time, as indicated by range history sets 234, 236, where ranges to different references correspond to the same time. Further, ranges may be determined relative to the same reference at different times, as indicated by the range history set 234 and a range history set 238.

The central controller 60 may act as a master hub. For example, the central controller 60 could be the Wi-Fi router 24 in the structure 36. The central controller 60 may be configured to determine ranging from the central controller 60 to the devices 40-47. The ranging may be conducted by the central controller 60 actively determining ranges to the devices 40-47, and/or receiving ranging information from the devices 40-47 as to ranges to the central controller 60. For example, Wi-Fi FTM (fine timing measurement) may be implemented by the controller 60 and/or one or more of the devices 40-47 for ranging purposes and may determine ranging intermittently (e.g., periodically). Further, the central controller 60 (e.g., the processor 180 and the transceiver 188) may send ranging information and/or other attribute information for one or more of the devices 40-47 to one or more of the devices 40-47. Also or alternatively, the controller 60 may broadcast the ranging information and/or other attribute information and may do so repeatedly/intermittently (e.g., periodically). Further still, the processor 180 may analyze attribute information from the devices 40-47 to determine shortest paths (e.g., fewest hops) through the devices 40-47 to each of the devices 40-47, e.g., for use in communicating with and/or locating one or more of the devices 40-47. The processor 180 may transmit information regarding the devices 40-47 to the devices 40-47, e.g., periodically, including attribute information (including ranging to other devices), shortest-paths to the controller 60, etc.

Based on maintained information, the central controller 60 may infer relationships between the devices 40-47. For example, the processor 180 may infer a location of a device based on a prior location and status of sensors since a time corresponding to the prior location. For example, the processor 180 may infer that the present location of a device is in the garage 68 if the last known location for the device is the garage 68 and the door opener 47 has not been used since that location was determined, and a door to the garage has been closed since that time. As another example, the processor 180 may infer a location of a device from multiple relative locations. For example, the processor 180 may infer a location of the tablet 44 from a known location of the TV 48, a range from the TV 48 to the smart phone 45, an AOA of signals from the TV 48 to the smart phone 45, a range from the smart phone 45 to the tablet 44, and an AOA of signals from the smart phone 45 to the tablet 44. The processor 80 may also or alternatively use this information (aside from the location of the TV 48) to determine the range between the TV 48 and the tablet 44 and/or the AOA of signals from the TV 48 to the tablet 44.

Device Registration

Figure 8:
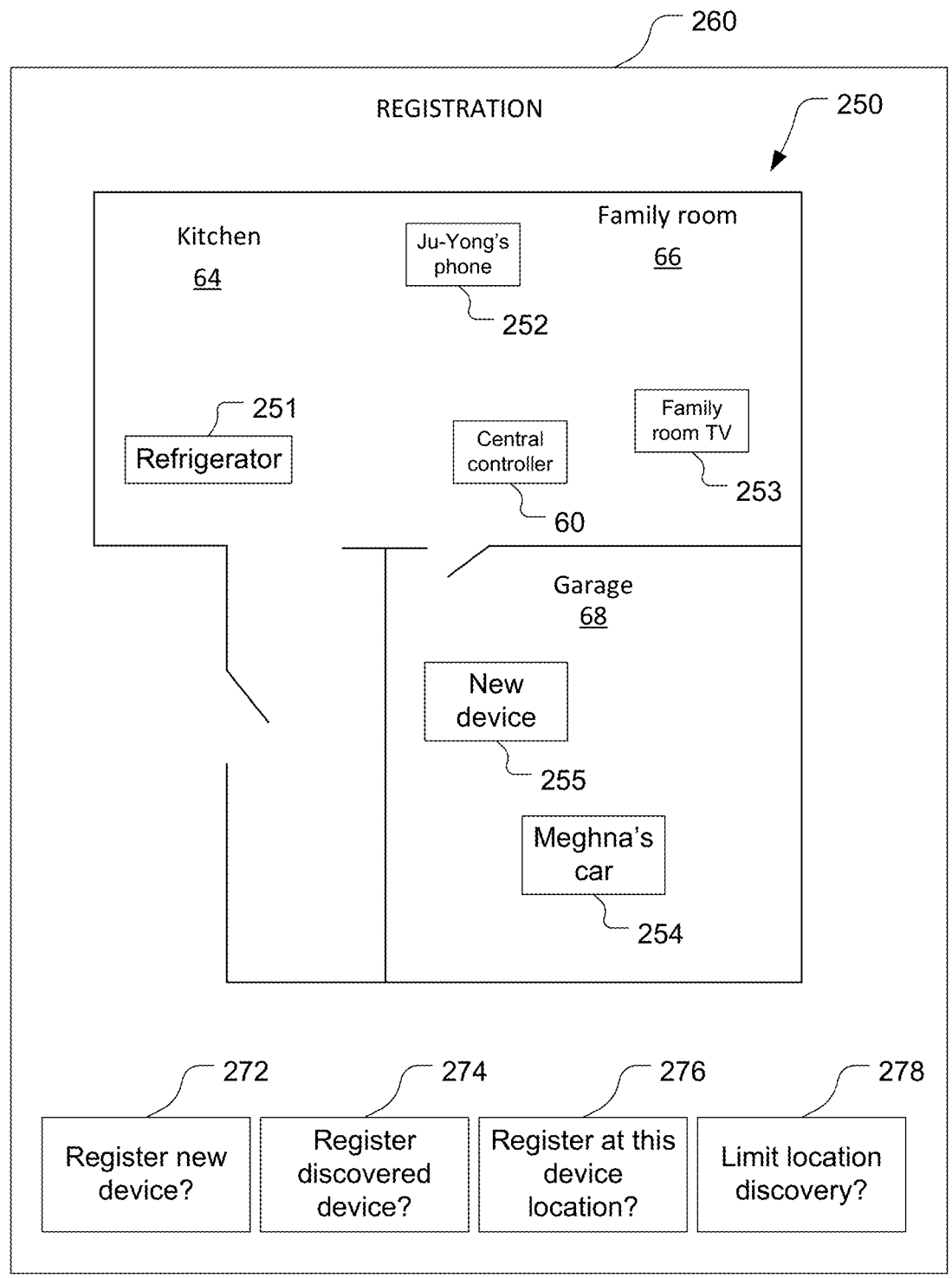
FIG. 8 is a screenshot of a user interface of the central controller shown in FIG. 2 for device registration.

Referring also to FIG. 8, the central controller 60 is configured to coordinate registration of devices, e.g., the devices 40-47 into the system 10 (see FIG. 1). The central controller 60 may be configured to interact with a user through the user interface 186 to register devices into the system 10. The central controller 60 can register devices manually and/or automatically to become part of the system 10, and in particular part of the system 10 within the structure 36. As an automatic example, the processor 180 may determine that a new device has entered a registration environment (e.g., a region near the controller 60) and automatically initiate registration. The processor 180 may determine that a new device has entered a registration environment by determining that signals are received from a device from which signals have not previously been received, or from a device not presently in a list of devices in the environment. Precautions may be taken to help ensure that only devices within a desired group are registered. For example, the processor 180 may require that a device is within a structure, or that the device is within a structure longer than a threshold amount of time, or that the device is seen within the structure at least a threshold number of times, before the controller 60 will attempt to register the device. As a manual registration example, a user may actuate a "register" feature (e.g., a "find new device" feature), for example by selecting a "Register new device?" icon 272 or a "Register discovered device?" icon 274 provided on a display 260 of the user interface 186. The processor 180 may respond to selection of the icon 272 by searching for new devices (e.g., in a predefined vicinity, in a user-defined vicinity, devices of a user-defined category, etc.). If a new (to the environment) device has already been detected, then the processor 180 may respond to selection of the icon 274 by continuing with a registration process (e.g., gathering attribute information) for this device. Manual registration may help prevent unwanted devices from being registered and may help facilitate registration of new devices. A "register" feature (e.g., to cause the processor 180 to have the display 260 prompt for registration information, e.g., as shown in FIG. 8) may be actuated on the central controller 60 and/or on a device to be registered that communicates with the central controller 60 to trigger the central controller 60 to search for new devices to be registered. Also or alternatively, the register feature could initiate a device that is not the central controller 60 registering another device.

The controller 60 may receive information through the user interface 186 in one or more of a variety of forms. For example, the user interface 186 may receive audio input through a microphone, touch input (e.g., through a keyboard, a keypad, and/or a touch-sensitive screen), visual input (e.g., through gestures captured by a camera, with possible gestures including sign language, pointing, etc.). Different gestures may be associated with different functions, such as one gesture to register a device, another gesture to search for the device (and possibly different gestures to search for different devices).

The controller 60 may provide information regarding the environment into which a new device may be registered. For example, as shown in FIG. 8, the processor 180 may cause the display 260 to display a map 250 of the structure 36 (here, a floor of the structure 36), the icons 272, 274, a "Register at this device location?" icon 276, and a "Limit location discovery?" icon 278 to help guide the user in registering a device. The icons 272, 274, 276, 278 are examples, and more, fewer (including zero), and/or different icons may be used. The map 250 shows a floor plan of the structure 36 and names and locations (graphical locations on the map 250) of various wireless communication devices. As shown, the map 250 shows a refrigerator 251, a mobile phone 252, a TV 253, a car 254, a new device 255, and the central controller 60. The user interface 186 may display further information regarding one or more of the wireless communication devices 251-255, e.g., in response to hovering a cursor over an icon for the respective communication device 251-255. This further information may include information from the device and/or from the device data history 210, for example, a mobility status and a numerical location for the respective device 251-255. The user interface 186 may display a customized name for any of the devices 251-255 for which a customized name has been established. In the example shown in FIG. 8, the mobile phone 252 is labeled "Ju-Yong's phone," the TV 253 is labeled "family room TV," and the car 254 is labeled "Meghna's car." These customized names may be displayed whenever the icon for the corresponding device is displayed, or may be displayed only in response to a request for such information, such as by hovering a cursor over the respective icon. The new device 255 may be labeled "new device," as shown, e.g., if no customized name has been provided and if no device type is yet known (e.g., no message has been received from the new device 255 or a received message does not include a customized name or device type). If a device type is known, e.g., tablet computer, then the new device 255 may be labeled with a generic name such as "new tablet."

The processor 180 may be configured to provide information through the user interface 186 in other ways. For example, processor 180 may provide augmented reality to the user through the user interface 186 to show the devices 251-255, their locations and possibly other information as discussed above. The augmented reality may also or alternatively provide suggested information as discussed below and may assist a user to register the new device 255, e.g., to select a location (at least an initial location) for the new device 255.

The processor 180 may be configured to prompt a user of the user interface 186 to provide and/or confirm information for registering a device. For example, the processor 180 can cause the display 260 provide the icons 272, 274 to prompt a user to initiate a registration request, to display the icon 276 to prompt the user to confirm that a location at which a device, e.g., the new device 255, is displayed is to be used as the (initial) location for the new device 255, and/or to display the icon 278 to prompt the user to provide privacy information regarding authorization to find the location of a device, such as the new device 255. While icons are discussed with respect to FIG. 8, other forms of prompts may be used, such as audio prompts. The icons 272, 274, 276, 278 may be displayed in response to input through the user interface 186 to initiate a registration, or may be automatically displayed in response to the processor 180 detecting the presence of the new device 255, e.g., by receiving signals from the new device 255 and determining that the new device 255 is not contained in the device data history 210. A prompt could request more information than a confirmation that a new device registration as desired. For example, a prompt could prompt the user for a name of a device to be registered, and/or could prompt (e.g., ask) for confirmation that a device highlighted on the display 260 is to be registered (e.g., in response to the controller 60 detecting a new device). A prompt could provide information regarding the new device 255, e.g., device type, device name, etc. that the processor 180 determines from communication with the new device 255, and ask the user to confirm the information.

The processor 180 may prompt the user for one or more attributes. For example, in response to actuation of the icon 278, the processor 180 may prompt the user for privacy settings for the new device 255, such as a password required to search for the new device 255, whether the new device 255 may be located, which devices are authorized to find the location of the new device 255, which devices are not authorized to find the location of the new device 255.

The new device 255 (i.e., an icon for the new device 255) may or may not be shown on the display 260. If, as in FIG. 8, the new device 255 is displayed, the new device 255 may be highlighted (e.g., shown in a distinct color such as red, shown in bold on the map 250, and/or shown with an arrow pointing to the icon for the new device 255, etc.). If a location of the new device 255 has not yet been determined, then the new device 255 may not be shown on the map 250, or may be shown in a default location, or may be shown at an expected location (e.g., based on a device type, if known, of the new device 255).

The central controller 60, in particular the processor 180, is configured to receive a registration request through the user interface 186. For example, a user may enter registration information (e.g., after actuation of either of the icons 272, 274 (or other appropriate registration initiation)) by typing the information into a keyboard, entering the information into a virtual keyboard or keypad shown on a touch-sensitive display of the user interface 186, and/or providing verbal information through a microphone of the user interface 186. The registration request may identify a device to be registered, here the new device 255, or may cause the processor 186 to identify the new device 255, e.g., by causing the transceiver 188 to pair with the new device 255.

The central controller 60 may perform ranging to the new device 255 to determine the present location of the new device. The controller 60 may perform ranging itself, e.g., using RSSI measurements from the new device 255 to the controller 60 and/or vice versa, RTT measurements between the controller and the new device, etc. The controller 60 may also determine a direction from the controller 60 to the new device 255, by determining AOA of signals from the new device 255 to the controller 60 or vice versa. The controller 60 may also, or alternatively, request other devices in the environment, such as the devices 251-254 (or any other device that receives a location/ranging request), to determine range (and possibly AOA) to the new device 255.

The processor 186 is configured to determine and provide a suggested registration location for the new device 255 through the user interface 186. The processor 180 may determine the suggested registration location based on one or more of various criteria. For example, the processor 180 may determine the suggested registration location based on a present location of the new device 255, or location input for the new device 255 received through the user interface 186, or a device name of the new device 255, or a device type of the new device 255, or a combination thereof. For example, if the new device 255 is close to (e.g., within five or 10 feet of) the refrigerator 251, or the family room TV 253, then the processor 180 may suggest a location of the kitchen 64 or the family room 66, respectively. As another example, if the name of the new device 255 includes a vehicle type, or if the vehicle type is known (for example from device attributes provided by the new device 255), e.g., "car," or "motorcycle," then the processor 180 may suggest a location has the garage 68. As another example, a user may provide location input such as coordinates, a reference distance to an object, a location on the map 250 (e.g., by touching a position on a touch-sensitive screen of the user interface 186), etc., and the processor 180 may use the location input as the suggested location or to determine the suggested location, e.g., by suggesting a location with the corresponding range that is logical (e.g., not behind a wall or occupying space of another object).

The processor 180 is preferably configured to receive input through the user interface 186 in response to providing the suggested location to the user. The processor 180 may receive input through the user interface 186 to modify, reject, or accept the suggested location and may store a modified location, or the accepted suggested location, e.g., in the attribute table 110 in response to the suggested location being modified or accepted. For example, the processor 180 may respond to selection of the icon 276 by confirming the suggested registration location. The processor 180 may highlight the icon 276 with a suggested device location provided to call attention to the option of registering the indicated device at the indicated location, which may provide a shortcut, reducing information that the user would enter manually. Indeed, the icon 276 may be selectable only in response to at least one unregistered device being discovered and a suggested location determined. The processor 180 may store another location, e.g., a default location, the location provided through the user interface 186, or no location, in response to the suggested location being rejected.

The registration request may supply a customized name for the new device 255 and/or the processor 180 may determine a suggested name. For example, the new device 255 may be a new motorcycle belonging to Sai and a customized name of "Sai's hog" provided in the registration request. Also, the processor 180 may determine a suggested name for the new device 255 and provide one or more indications of the supplied name and/or the suggested name through the user interface 186, e.g., by providing text, graphics, audio, etc. indicating the supplied name and/or the suggested name. The processor 186 may extract a customized name for the new device 255 from information received from the new device 255, e.g., in the attributes provided by the new device 255. The processor 180 may be configured to determine the suggested name based on a present location of the new device 255, a name of a user of the user interface 186 (or other user interface being used, e.g., the user interface 86 if the new device 255 is being used to register the new device 255), a name or title of a person associated with another device that is or has been in close proximity to the new device 255, or a combination thereof. For example, with the new device 255 being disposed in the garage 68, the processor 180 may infer that the new device 255 is a vehicle and suggested name of "car." The processor 180 may be configured to further customize the suggested name based on further information. For example, if the processor 180 also knows, e.g., from the attributes provided by the new device 255, that the new device 255 is a motorcycle, and that a user named Sai entered the registration request, then the processor 180 may suggest a name of "Sai's motorcycle" for the new device 255. As another example, if the new device 255 is presently located in the family room 66, and the processor 180 knows that the new device 255 is a television, then the processor 180 may suggest a name of "family room TV." If the processor 180 knows that the new device 255 is a television, but does not know a location of the new device 255, the processor 180 may suggest a name of "TV" and provide a prompt through the user interface for clarifying information for the name. As another example, if the new device 255 has been in close proximity (e.g., within two feet) to Ju-Yong's phone 252, and a device type of the new device 255 is a tablet computer, then the processor 180 may suggest a name for the new device 255 as "Ju-Yong's tablet." The processor 180 may be configured to use the name or title of the person associated with the other device in particular where the other device has been in close proximity to the new device 255 for some amount of time, e.g., more than a minute, and especially while new device 255 and the other device were moving.

The processor 180 is configured to cause the user interface 186 to provide one or more indications of the suggested name and to receive input through the user interface 186 in response to providing the suggested name to the user. The processor 180 may receive input through the user interface 186 to modify, reject, or accept the suggested name and may store a modified name, or the accepted suggested name, e.g., in the attribute table 110 in response to the suggested name being modified or accepted. An icon could be provided to ask the user whether the user wants to use the suggested name for registering the new device. The processor 180 may store another name, e.g., a default name, a name provided through the user interface 186, a name provided by the new device 255, or no name, in response to the suggested name being rejected.

The processor 186 is configured to update device information to include information for the new device 255. For example, the new device 255 may provide attribute information for the new device 255 and the processor 186 may update an attribute table such as the attribute table 110 with attribute information for the new device 255.

The registration may be performed by one or more devices in addition to or instead of the central controller 60. For example, the new device 255 may provide the user interface for registering the device. The new device 255 may be implemented by the device 70 including the user interface 86. The new device 255 may be configured to perform functions as discussed above to help a user register the new device 255. The information received/determined by the new device 255, or another device (e.g., ranging to the new device 255), during registration may be stored by the new device (e.g., in the memory 82) and/or provided to the central controller 60 by the transceiver 88 for storage in the memory 182 of the central controller 60, e.g., in an attribute table.

Device Search/Locating

The central controller 60 may be configured to coordinate inquiries regarding the locations of the devices 40-47. For example, the controller 60 may send, e.g., broadcast, a query for a location of a target device. Neighboring devices, i.e., those that receive the query from the controller 60 can relay the query, e.g., if the receiving/relaying device has at least one neighbor that is not a neighbor of the controller 60. Any device (a "locating device") that finds the target device can send ranging/location information to the central controller 60, preferably through a shortest route from that device to the controller 60 as indicated by the controller 60 (e.g., in one or more messages prior to the query, or in the query itself). The controller 60 is configured to determine the location of the target device from ranging information received from the locating device, e.g., in conjunction with a known location of the device providing the ranging information.

Figure 9:
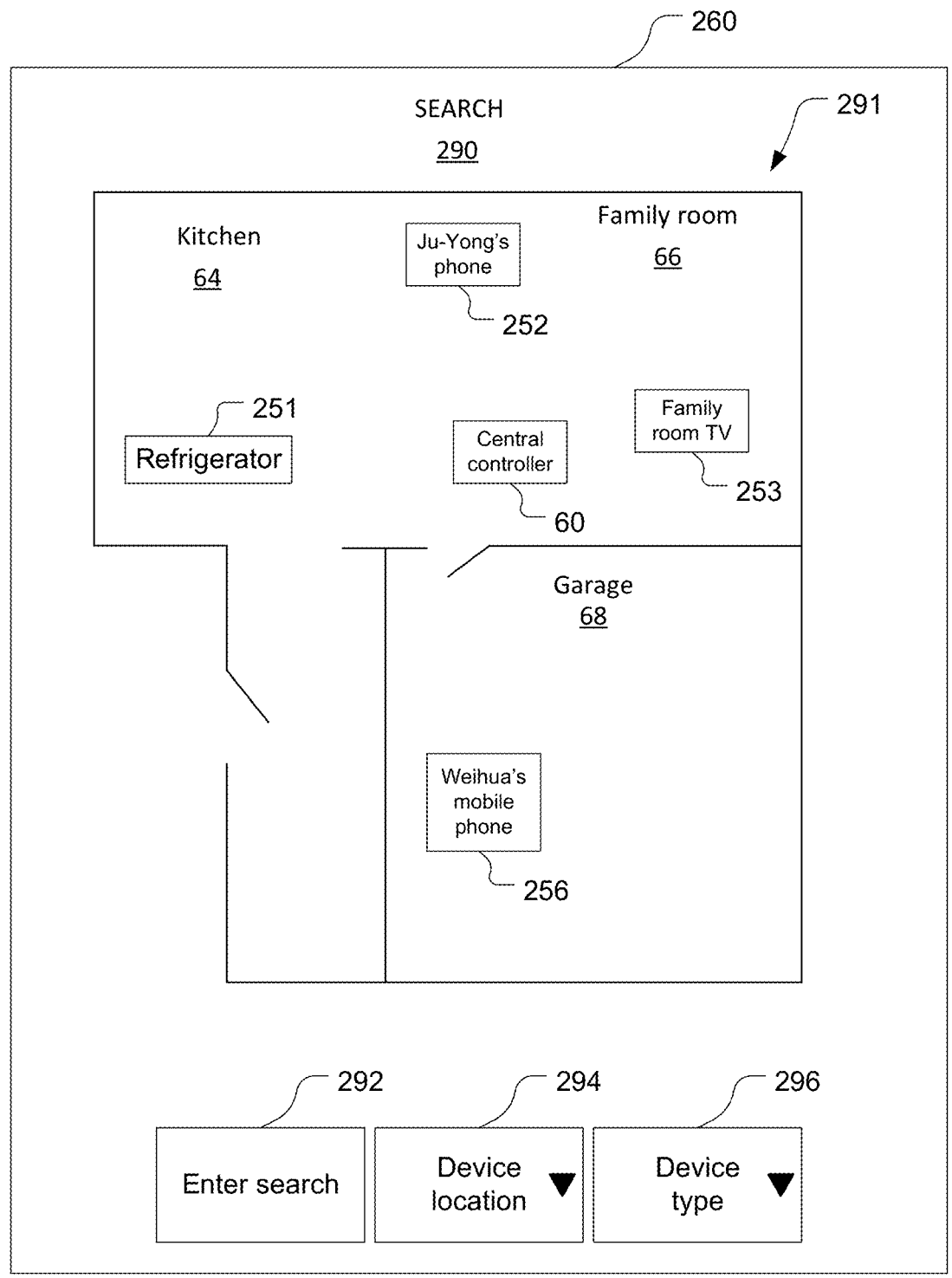
FIG. 9 is a screenshot of a user interface of the central controller shown in FIG. 2 for device search.

Referring to FIG. 9, with further reference to FIGS. 1-2 and 6-7, the processor 180 is configured to cause the user interface 186 to provide a search screen 290, e.g., in response to user input, e.g., initiating or requesting a search. The search screen 290 includes a map 291, an "Enter search" icon 292, a device location drop-down menu icon 294, and a device type drop-down menu icon 296. The icon provides a prompt to request to enter one or more search criteria relating to a target device to be found. The user interface 186 may provide any of a variety of techniques for entering search criteria, such as through voice input, selection of an option from a drop-down menu not shown, selection of one or more icons for one or more criteria for the target device, e.g., selection of a location such as home, office, etc., using the drop-down menu of the icon 294 and/or a device type such as phone, key, wallet, headphone, TV, tablet, etc. using the drop-down menu of the icon 296. The processor 180 may be able to find the target device and the location of the target device from stored data, e.g., in the device data history 210 (FIG. 7), and/or may produce a search query to locate the target device.

The central controller 60 is configured to help produce a search query for locating the target device. The processor 180 may use the one or more search criteria as a first part of the search query and may determine a second part of the search query based on the first part of the search query and an association of the first part of the search query and an entity that is associated with the target device. For example, the processor 180 may determine an entity from a linking or association of device IDs and entities, e.g., in a look-up table, and then determine a device ID for the target device using this same linking, but for the device type requested in the search criteria. For example, the processor 180 may be configured to recognize a voice of the user providing the first part of the search query to formulate the complete search query. As an example, the processor 180 may recognize Weihua's voice in response to Weihua saying "find my mobile phone." In response, the processor 180 may formulate a search query of "find Weihua's mobile phone." The processor 180 is configured to form the search query in a format usable by the devices 251-255 to locate the desired target device by finding an ID of Weihua's phone, e.g., by populating a device ID field with a device ID for Weihua's mobile phone as found in a look-up table linking devices and owners. As another example, the processor 180 may recognize a device from which search criteria are sent to the central controller GO. For example, the processor 180 may determine a device ID from a communication from Weihua's tablet, and locate this device ID in the device name/ID field 213 of the device data history 210 (and/or in an attribute table or other record). The processor 180 may further determine the entity associated with that device ID, for example, Weihua, by analyzing the entity field 224 for the corresponding device ID. The processor 180 may further find the device ID for the requested device type, here mobile phone, corresponding to the determined entity, e.g., using a look-up table linking devices and owners. Thus, in response to a request to find "my mobile phone" received from Weihua's tablet, the processor 180 may form a search query for Weihua's mobile phone with the corresponding device ID.

The processor 180 is further configured to transmit the search query to one or more devices to attempt to locate the target device. The processor 180 may cause the transceiver 188 to send the search query and one or more outbound electronic signals to one or more of the wireless communication devices 251-255. For example, the processor 180 may cause the transceiver 188 to broadcast the search query to any wireless communication device within communication range of the controller 60. Alternatively, the processor 180 may cause the transceiver 188 to unicast the search query to a particular device or to multicast the search query to particular devices. Which device(s) the search query is sent to may depend on privacy settings for the devices and/or for the target device (e.g., which devices are authorized to find the target device) and/or which devices have a radio compatible with a radio of the target device.

The central controller 60 may send a request for a location of a target device using a protocol that is not supported, at least presently, by the target device. Although the description herein may refer to the target device not having a particular radio, this includes scenarios where the target device has the radio, but the radio is not presently operational (e.g., turned off, not functioning properly, etc.). The processor 180 may send the request via the transceiver 88, and in particular one of the radios 190, 192, 194, while the target device may not have a corresponding radio. For example, a target device may only have a BT-LE radio while the controller 60 may not have a BT-LE radio. Thus, the processor 180 may send the request via one of the radios 190, 192, 194 according to a corresponding communication protocol but the target device may not be configured to receive or send communications according to that communication protocol. For example, the processor 180 may send a request via the Wi-Fi radio 192 but the target device may not be configured with, i.e., may lack, a Wi-Fi radio, for example only containing a cellular radio and a BLUETOOTH radio. Indeed, the controller 60 may lack the type of radio (or radios) that the target device has. The request may indicate the type(s) of radio needed to communicate with the target device (i.e., that the target device includes). The processor 180 may be configured to send the request via the transceiver 88 to an intermediate device that that can communicate the request directly to the target device, e.g., with the intermediate device containing a radio that can communicate (is capable of communicating) with the target device and possibly that satisfies one or more other criteria. These other criteria may be, for example, that the intermediate device is authorized to pair with the target device, e.g., is included in a list of trusted devices for the target device included in the target device's attributes. The request may or may not be sent directly to the intermediate device(s) as there may be multiple relaying devices in between the controller 60 and the target device, with the relaying devices relaying the request to each other, using appropriate communication protocols that may or may not be the same as the processor 180 used to transmit the request initially and/or may or may not be the same communication protocol used by the target device to receive the request. The processor 180 is preferably configured to determine that the target device lacks the type of radio that the processor 180 will, or can, use to transmit the request, and that the intermediate device does contain the appropriate type of radio. The processor 180 may be configured to include a destination address of the intermediate device in the request. The processor 180 may be configured to determine multiple intermediate devices that each has a radio that can communicate wirelessly with the target device and produce one or more requests with the destination addresses of the intermediate devices so determined and transmit the request(s) to these intermediate devices.

The central controller 60 may be configured to send a request for a location of a target device to the last known device that communicated with the target device. For example, the controller 60 may use the communication history field 218 as shown in FIG. 7 corresponding to the target device to determine the intermediate device to which the controller 60 will send the request for the location of the target device. The controller 60, and in particular the processor 180, may be configured to send the request to the intermediate device such that the intermediate device is the last known, to the controller 60 according to the device data history 210, device to communicate with the target device. The processor 180 may be configured to transmit the request for the location of the target device to multiple intermediate devices in reverse chronological order of the intermediate devices communicating with the target device. For example, referring to FIG. 7, and in particular to the communication history field 218 corresponding to the tablet, the processor 180 may send the request to device1, then device2, then device3, then device4 if time6 is a most-recent time, time7 is a next-most-recent time to time6, time8 is a next-most-recent time to time7, and time9 is a next-most-recent time to time8. The processor 180 may be configured to send the request to a next device only if sending the request to a previous device did not result in the target device being found. For example, the processor 180 may be configured to send the request to a next device only if a threshold amount of time passes after sending the request to a previous device without receiving a reply from the previous device that the previous device located the target device. Of course, the controller 60 may attempt to contact the target device directly, e.g., if the controller 60 has a radio that is compatible with a radio of the target device (or if this is unknown), and the controller 60 may be configured to send the request to an intermediate device only if the controller 60 fails to contact the target device directly. Further, the controller 60 may assume (e.g., set) the location of the last known device to communicate with the target device as the location of the target device until information is received to the contrary.

The request for the location of the target device may include (explicitly or implicitly) a command or request for the intermediate device that locates the target device to determine and report a position of the target device relative to the intermediate device. The intermediate device that finds (e.g., is able to communicate with) the target device may determine a range to, and possibly a direction of, the target device relative to the intermediate device. The intermediate device also preferably provides the location of the intermediate device, e.g., global coordinates, coordinates referenced to a reference point or object, a point-of-interest location name, etc.

The processor 180 is configured to determine the location of the target device identified in a search query from information received in response to the search query, e.g., from one or more of the devices 251-255. The processor 180 is configured to receive one or more inbound electronic signals wirelessly from any or a combination of the devices 251-255, or other wireless communication device, and to determine the location of the target device from the electronics signal(s). The processor 180 may process information provided from the devices 251-255, e.g., RSSI information, OTDOA information, RTT information, SPS information, ranging information, AOA information, location of the device that found the target device, etc. to determine the location of the target device. The processor 180 may also determine the location of the target device from an indication of the location of the target device in the communication(s) received.

The processor 180 is configured to provide an indication of the location of the target device through the user interface 186. For example, the processor 180 may cause the user interface 186 to provide a visual indication and/or an audible indication of the location of the target device. For example, the processor 180 may cause the user interface 186 audibly to indicate a range to a particular device, such as "Your mobile phone is within five feet of the family room TV," or "Your mobile phone is five feet Southwest of the family room TV," or "Your mobile phone is five feet from the family room TV toward the refrigerator." As another example, the processor 180 may cause the user interface 186 to display a graphic indication (e.g., a red dot, a red arrow, text such as "Weihua's mobile phone" as shown by an icon 256 in FIG. 9, etc.) of the location of the target device on the map 291. As another example, the processor 180 may also or alternatively be configured to provide to the user an augmented reality location to the target device. For example, the processor 180 may be configured to guide or direct the user through augmented reality using a display screen of the user interface 186 to lead the user to the target device. The user could hold the user interface 186 up and the user interface 186 may capture the environment with a camera and display directional indications (e.g., to move forward, to the right, to the left, up, down, and/or to reverse direction), or may provide an indication of the target device as if any barriers such as walls were transparent. The user interface 186 may also provide audio directions. The user interface used for the augmented reality may be the user interface 86 used to initiate a search query, e.g., a user interface of a mobile phone or tablet, etc.

Operation

Figure 10:
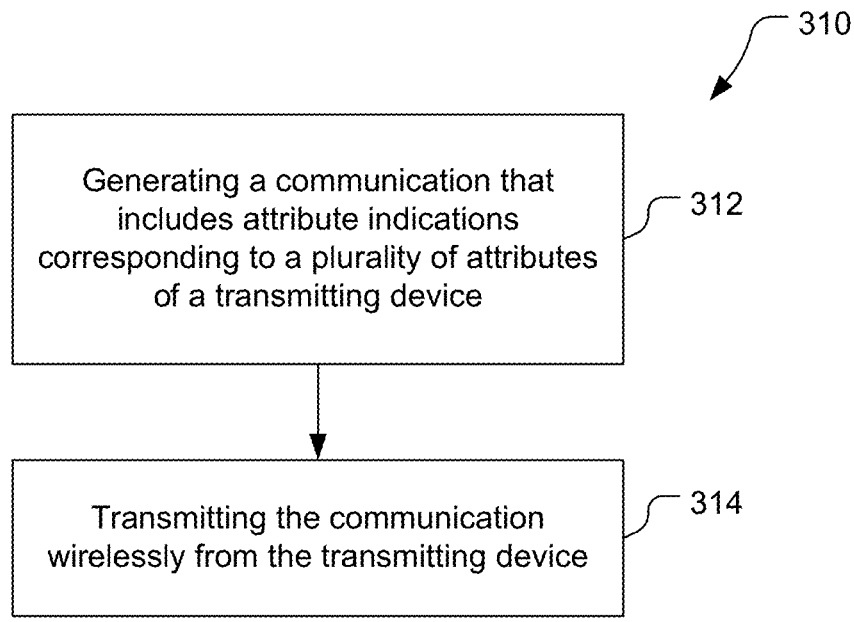
FIG. 10 is a block flow diagram of a method of wireless communication.

Referring to FIG. 10, with further reference to FIGS. 1-8, a method 310 of wireless communication includes the stages shown. The method 310 is, however, an example only and not limiting. The method 310 can be altered, e.g., by having stages added, removed, rearranged, combined, performed concurrently, and/or having single stages split into multiple stages.

As shown in FIG. 10, at stage 312, the method 310 includes generating a communication that includes attribute indications corresponding to a plurality of attributes of a transmitting device, and at stage 314 the method 310 includes transmitting the communication wirelessly from the transmitting device. For example, the device 70, and in particular the processor 80, produces a communication that includes attributes of the device 70 and transmits the communication wirelessly using the transceiver 88. The device 70 may transmit the communication using one or more of the radios 90, 92, 94.

The attributes of the communication may include one or more items that a user has input through the user interface 86 (if present) such as a default mobility type, one or more items that are programmed in the device 70 during manufacture, one or more items determined by the processor 80, and/or one or more items provided to the device 70. For example, the user may input a default mobility type through the user interface 86. As another example, a device type, and/or a device ID, and or one or more other items may be programmed in the device 70 during manufacture. As another example, signal measurements (e.g., RSSI, RTT, OTDOA, SPS signals), location of the device 70, range from the device 70 to a reference point or object, angle of arrival of one or more signals, present mobility status of the device 70, and/or one or more items may be determined by the processor 80 and/or provided to the device 70, e.g., by one or more of the devices 40-47 shown in FIG. 2 and/or the central controller 60. An attribute indication may be an explicit indication transmitted by the device 70 or may be derived by a receiving device. If the attribute indication is an explicit indication, the device 70 may determine, before transmitting the explicit attribute indication, that a receiving device is authorized to receive the attribute indication. As an example of a derived attribute indication, a receiving device may determine that the device 70 has not moved for a threshold amount of time, and therefore determine that a mobility status of the device 70 is "static."

The attributes may include a variety of different information. For example, the attributes may include a device identity of the device, a mobility indication indicative of whether the transmitting device is mobile or static, a location indication indicative of a location of the transmitting device, and a privacy indication associated with a corresponding attribute of the transmitting device. The privacy indication indicates whether a receiving device that receives the attribute indications from the transmitting device will be authorized to transmit information regarding the corresponding attribute of the transmitting device. For example, the privacy indication may, as shown in FIG. 4, indicate whether a particular attribute is public, and thus may be shared, or private, and thus may not be shared beyond the receiving device. The privacy indication may also indicate whether at least one other device in addition to the receiving device is authorized to transmit information regarding the corresponding attribute. For example, the privacy indication may indicate that the devices 41-43 may transmit a corresponding attribute, or that the devices 44-47 may not transmit the corresponding attribute.

Still other attribute indications may be included in the communication from the device. For example, the attribute indications may include an identity of an attribute for which an indication is not being transmitted by the transmitting device. Thus, for example, the device 70 may send an indication that an entity (e.g., an owner) associated with the device 70 is not being sent (e.g., because there is no owner or because the association of the owner is not desired to be shared). The attribute indications also or alternatively may further include one or more indications of a list of one or more trusted devices associated with the transmitting device, or a round-trip time associated with another device, or an angle of arrival of a signal at the transmitting device, or a supported ranging protocol (or protocols), or a ranging uncertainty, or a location uncertainty, or a neighbor list indicative of access points neighboring the transmitting device, or a neighbor list history, or whether the transmitting device may be presented on a map, or whether angle-of-arrival determinations are supported, or a combination thereof.

The communication may include an attribute other than the device identity, the mobility indication, the location indication, and the privacy indication depending on one or more factors. For example, the processor 80 may include a further attribute indication based on a time and/or a location of the device 70. Also or alternatively, the processor 80 may base a value of a further attribute indication, included in the communication, on a time and/or a location of the device 70. Time, in either or both of these examples, may be a time of day, or a day of week, or a day of year, an elapsed time, or a combination thereof. Location, in either or both of these examples, may be a location relative to another device, or a location relative to a structure, or a location relative to a reference point, or a global location, or a civic location or a point of interest location, or a combination thereof.

The method 310 may further include relaying communications from the device to other devices. Using an example of the device being the TV 48 shown in FIG. 2, the method 310 may include receiving a request from the central controller 60 for a location of the tablet 44, transmitting the request for the location of the tablet 44 to another device (e.g., the tablet 44 and/or the smart phone 45), receiving a reply from the other device (e.g., the tablet 44 and/or the smart phone 45), and transmitting a message to the central controller 60 including an indication of the location of the tablet 44. The location of, in this example, the tablet 44, may be provided in any of a variety of formats such as a distance relative to the TV 48 (or to the mobile phone 44), a distance relative to the TV 48 (or to the mobile phone 44) plus a direction relative to the TV 48 (or to the mobile phone 44), global coordinates, local coordinates relative to a reference point (e.g., ENU coordinates relative to the origin 11), etc.

The method 310 may further include associating a point-of-interest name with the device. A common name may be linked to and stored by the device 70. For example, the method 310 may include the device 70 receiving a point-of-interest name associated with another device and storing, in the memory 82, the point-of-interest name associated with the other device as an indication of the location of the device 70. Thus, for example, if the device 70 was introduced into the family room 66, but had not yet stored a point-of-interest name as one of its attributes, and the device 70 receives signals from the TV 48 indicating that the point-of-interest name of the location of the TV 48 is "family room," then the device 70 may store the name "family room" as a point-of-interest name of the location of the device 70, e.g., in an attribute table in the memory 82. As another example, the method 310 may include the device 70 receiving a mapping of point-of-interest names and associated geographic locations, determining which of the geographic locations corresponds to the location of the device 70, and storing, in the memory 82, the point-of-interest name associated with the geographic location that corresponds to the location of the device 70. Thus, for example, if the device 70 determines coordinates for the location of the device 70, and those coordinates correspond to the garage 68, then the device 70 may store a point of interest name of "garage" in the memory 82 as an attribute for the device 70.

The method 310 may include indicating that a supposedly static device has moved. For example, the method 310 may include the device 70 receiving an indication from another device that the other device is a static device (e.g., according to the attributes of the other device), determining that a location of the other device relative to the device 70 changes, and transmitting an indication that the location of the other device relative to the device 70 changed. Thus, for example, the device 70 may provide an indication that another device, such as the TV 48, is moving in an unexpected manner, e.g., such as by being stolen, moved by children, etc.

Figure 11:
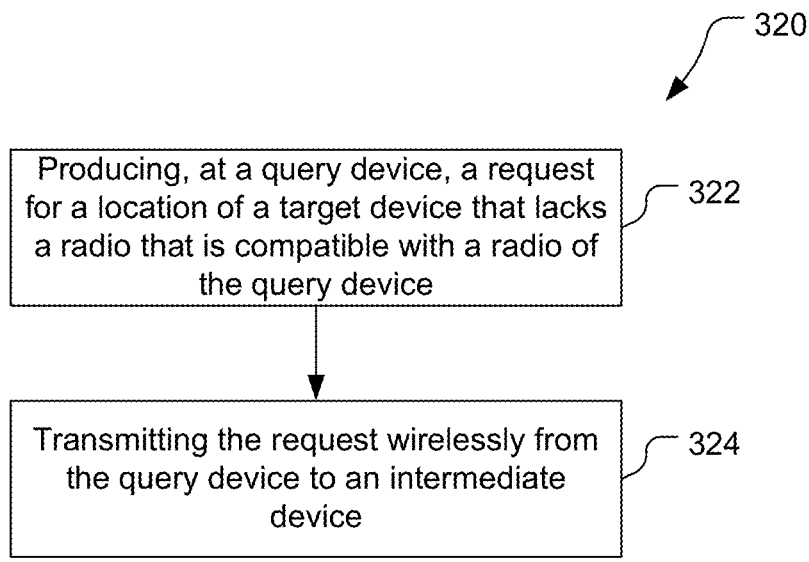
FIG. 11 is a block flow diagram of a method of locating a wireless communication device.

Referring to FIG. 11, with further reference to FIGS. 1-8, a method 320 of locating a target device includes the stages shown. The method 320 is, however, an example only and not limiting. The method 320 can be altered, e.g., by having stages added, removed, rearranged, combined, performed concurrently, and/or having single stages split into multiple stages.

As shown in FIG. 11, at stage 322, the method 320 includes producing, at a query device, a request for a location of a target device that lacks a radio that is compatible with a radio of the query device. The query device includes a first radio, of a first type, configured to communicate wirelessly using a first communication protocol. The target device lacks a radio of the first type but includes a second radio, of a second type, configured to communicate wirelessly using a second communication protocol. The second communication protocol is incompatible with the first communication protocol. The communication protocols are incompatible in that a device using the first communication protocol cannot communicate with a device using the second communication protocol, or vice versa, e.g., due to the different communication protocols using different frequencies and/or different data packet formats (e.g., different meanings to fields, different field sizes, etc.). For example, assume that the central controller 60 includes the Wi-Fi radio 192 and the LTE radio 194, but does not include the BLUETOOTH radio 190, the tablet 44 includes the Wi-Fi radio 92 and the BLUETOOTH radio 90, and the TV 48 includes the BLUETOOTH radio 90 only, and the central controller 60 wants to know the location of the TV 48. The central controller 60 may produce a request for the location of the TV 48 despite the central controller 60 not having a radio compatible with a radio of the TV 48.

At stage 324, the method 320 includes transmitting the request wirelessly, from the query device to an intermediate device, using the first radio. Continuing the example from above, the central controller 60 may send the request using the Wi-Fi radio 192. The request may be received by the tablet 44 via the Wi-Fi radio 92 of the tablet 44, relayed/re-transmitted by the tablet 44 using the BLUETOOTH radio 90 of the tablet 44, and received by the TV 48 using the BLUETOOTH radio 90 of the TV 48. The request may not be relayed/re-transmitted by the tablet 44, e.g., if the tablet 44 knows a location of the TV 48 and can report this location to the central controller 60.

The method 310 may further include the query device determining that the target device lacks a radio type included in the query device. For example, the method 310 may further include determining, at the query device, that the target device lacks a radio of the first type, determining that the intermediate device includes a radio of the first type, and producing the request to include a destination address of the intermediate device. Determining that the intermediate device includes a radio of the first type may comprise determining that each of multiple intermediate devices includes a radio of the first type. Producing the request to include the destination address of the intermediate device may comprise producing the request to include destination addresses of the multiple intermediate devices, and transmitting the request may comprise transmitting the request to the multiple intermediate devices.

Using the method 310, the query device may attempt to determine the location of the target device by querying one or more devices that most-recently communicated with the target device. For example, the method 310 may further comprise determining that the intermediate device is the last known device with which the target device is known, by the query device, to have communicated. For example, the central controller 60 may analyze the device data history 210, and in particular the communication history field 218, to determine the device with which the target device most recently communicated. The central controller 60 may transmit a request to one or more devices other than the device with which the target device most recently communicated according to the communication history field 218. Thus, the method 310 may further include transmitting the request to at least one other intermediate device where transmitting the request to the intermediate device and to the at least one other intermediate device are performed in reverse chronological order of last known, by the query device, communicated with the intermediate device and the at least one other intermediate device, respectively. For example, in accordance with the device data history 210 shown in FIG. 7, the central controller 60 may send the query to device 1, then device2, then device3, then device4. The central controller 60 may only send the query to more than device 1 if sending the query to device 1 did not result the central controller 60 obtaining the location of the target device (either by having the location sent to the central controller 60 or having information sent to the central controller 60 from which the location could be determined).

The query device may obtain information regarding the available radio types of various devices. For example, the method 310 may further include receiving, by the query device, a list of target device attributes including each available radio type of the target device. The list of target device attributes may be received by the query device wirelessly using a receiving radio that is of a type of radio that is lacking in the target device. For example, the central controller 60 may receive, via the Wi-Fi radio 192, a device attribute table from the TV 48 by way of the tablet 44.

Figure 12:
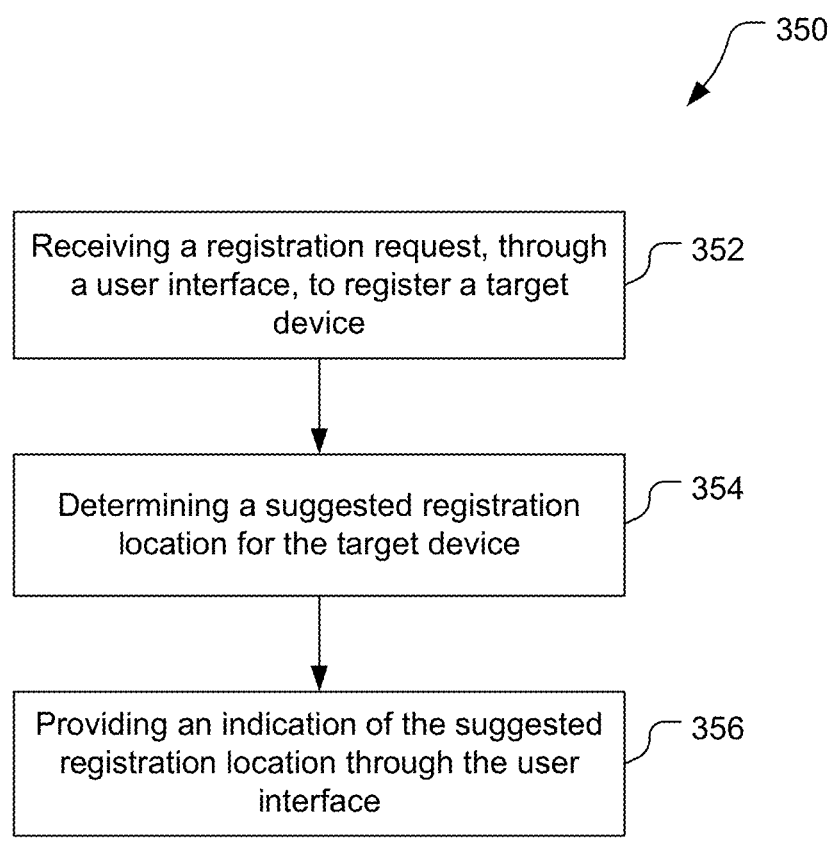
FIG. 12 is a block flow diagram of a method of registering a wireless communication device.

Referring to FIG. 12, with further reference to FIGS. 1-10, a method 350 of registering a target device includes the stages shown. The method 350 is, however, an example only and not limiting. The method 350 can be altered, e.g., by having stages added, removed, rearranged, combined, performed concurrently, and/or having single stages split into multiple stages.

At stage 352, the method 350 includes receiving a registration request, through a user interface, to register a target device. For purposes of illustrating an implementation of FIG. 12, and not by way of limitation, an example is discussed below of registering Weihua's tablet as the new device 255 shown in FIG. 8 by using the central controller 60. In this example, the registration request may be received by the central controller 60, and in particular the processor 180, via the user interface 186. For example, the user may actuate the register new device icon 272. The request itself may provide further information, e.g., identifying the new device 255 (or other device to be registered), or further information may be prompted by the processor 180 through the user interface 186 in response to actuating the icon 272. Alternatively, the registration request may be an indication that the user actuated the register discovered device icon 274, with the map 270 indicating the discovered device 255. In other implementations, the registration request may be input into the user interface 86 of the device 70 (e.g., one of the devices 40-47 or another device) and sent to the central controller 60. Still other registration requests are possible.

At stage 354, the method 350 includes determining a suggested registration location for the target device. For example, the suggested registration location may be for a location within a range of a short-range wireless communication radio (e.g., a Wi-Fi radio, a BLUETOOTH radio, a BLUETOOTH Low-Energy radio). As a further example, the suggested registration location may be within a building. Determining the suggested registration location for the target device may be based on a present location of the target device, or location input for the target device received through the user interface, or a device name of the target device, or a device type of the target device, or a combination thereof. The central controller 60 may determine a location of the new device 255, e.g., through ranging from the central controller 60 and/or communication with one or more other devices (e.g., the devices 40-47) to determine a present location of the new device 255. Also or alternatively, the user may provide location input, e.g., by selecting a location on the map 250 with a mouse click corresponding to a cursor location on the map 250, or a touch of a touch-sensitive display showing the map 250. Also or alternatively, the user or the new device 255 itself may provide a device name and/or device type and the processor 180 may use this information to determine the suggested location (e.g., to be inclined to suggest the kitchen 42 for a kitchen appliance device type or a device name expressing or implying a kitchen appliance, or to be inclined to suggest the garage 68 for a vehicle device type or a device name implying an item typically found or stored in a garage). In the illustrative example, the central controller 60 receives a device type of "tablet" determines a range from the door opener 47, and thus suggests an indoor location (here, in the family room 66) of the new device 255 at the determined distance from the door opener 47.

The method 350 may include providing a suggested device name for the target device through the user interface. Continuing the example from above, the processor 180 may cause the user interface 186 to provide a suggested device name of "Weihua's tablet," e.g., audibly through a speaker and/or visually on a display screen. The method 350 may include determining the suggested device name, e.g., based on a present location of the target device, a name of a user of the user interface, a name or a title of a person associated with at least one other device that is or has been in close proximity to the target device (e.g., throughout a time period, such as at least a minute, during which the other device was in motion), or a combination thereof. For example, if the processor 180 recognizes Weihua's voice from an audible input through a microphone of the user interface 186 of a request of "register my tablet," then the processor 180 may cause the user interface to provide the suggested device name of "Weihua's tablet." The processor 180 may provide the same suggested device name in response to the device being registered being a tablet and having been close to (e.g., within five feet, or two feet, etc.) Weihua's mobile phone for a threshold amount of time (e.g., one minute, one hour, etc.). The threshold amount of time may depend on whether the other device and the device being registered are/were in motion (e.g., a threshold without movement may be an hour while a threshold during movement may be a minute). The threshold may also depend on an amount of movement (e.g., an hour for movement less than 20 feet or within the structure 36, or one minute for movement over 20 feet and outside the structure 36).

The method 350 may include providing a prompt through the user interface for an indication of whether the device being registered is authorized to be found by other devices. For example, the processor 180 may cause the user interface 186 to provide the icon 278 asking the user whether the user wishes to limit the location discoverability of the new device 255. The method 350 may further include providing a prompt for indications of which other devices are authorized to find the new device 255. For example, in response to the user selecting the icon 278, the processor 180 may cause the user interface 186 to prompt the user to select and/or enter devices authorized, or not authorized, to discover and/or report the location of the new device 255.

Figure 13:
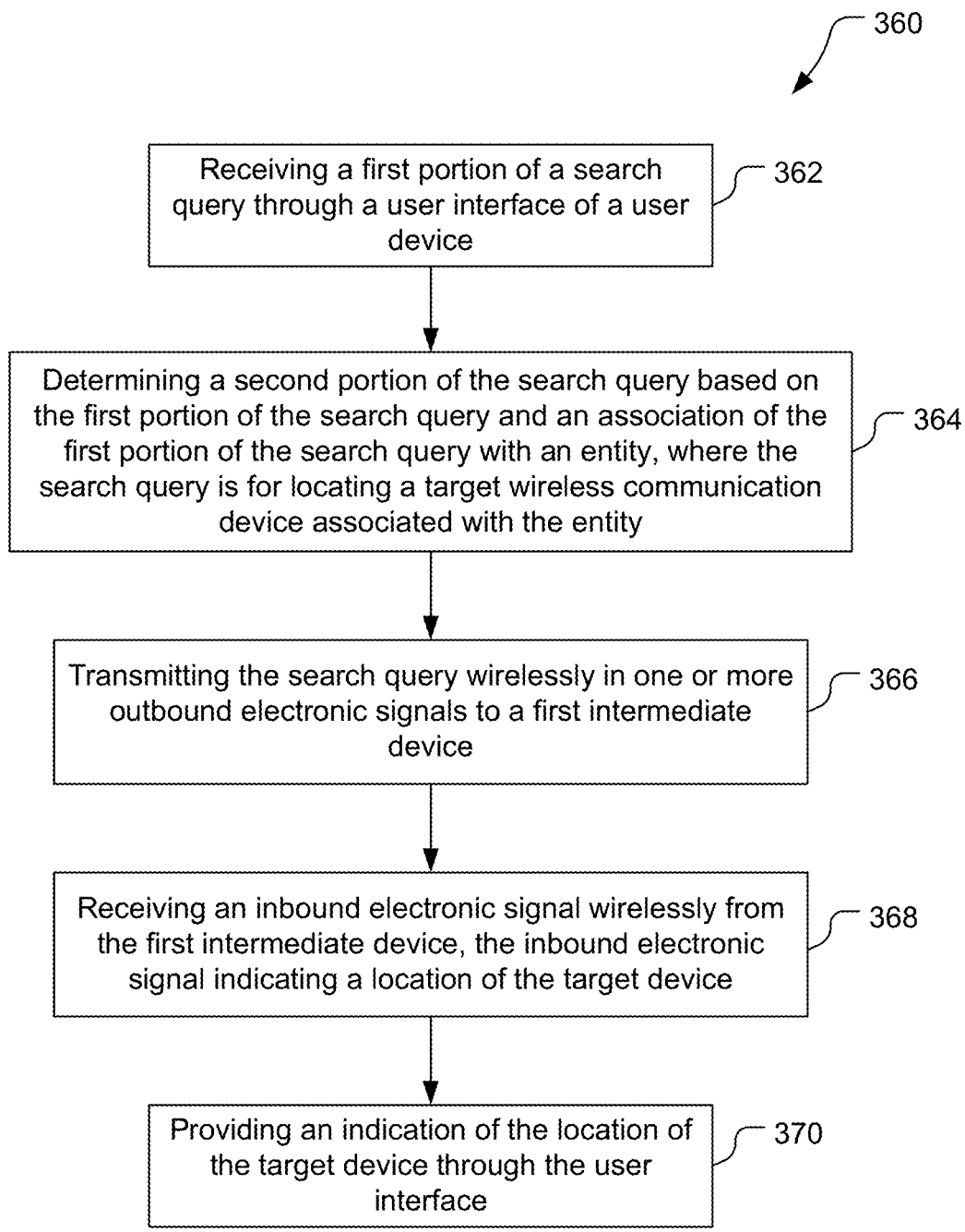
FIG. 13 is a block flow diagram of a method of assisting a user of a wireless communication device.

Referring to FIG. 13, with further reference to FIGS. 1-10, a method 360 of assisting a user of a user device includes the stages shown. The method 360 is, however, an example only and not limiting. The method 360 can be altered, e.g., by having stages added, removed, rearranged, combined, performed concurrently, and/or having single stages split into multiple stages.

At stage 362, the method 360 includes receiving a first portion of a search query through a user interface of a user device. For example, the processor 180 receives a request for the location of a device through the user interface 186. As an example of such a request, the processor may receive a request (e.g., audible, text, etc.) of "Find my phone" from Ju-Yong.

At stage 364, the method 360 includes determining a second portion of the search query based on the first portion of the search query and an association of the first portion of the search query with an entity, where the search query is for locating a target device associated with the entity. For example, the method 360 may further include identifying a user of the user interface based on the first portion of the search query. Thus, the processor 180 may link the request to a person, e.g., based on recognizing the user's voice, or recognizing a device from which the request was received, etc., and use this link to expand if not complete the search query. Continuing the example from the discussion of stage 362, in response to the request of "Find my phone" from Ju-Yong, the processor may recognize Ju-Yong's voice, or that the request came from Ju-Yong's computer (or other device associated with Ju-Yong), and determine that a second part of the query is "Ju-Yong," and thus make the search query "Find Ju-Yong's phone" in lay terms, with the actual inquiry being formatted appropriately for interpretation by receiving devices.

At stage 366, the method 360 includes transmitting the search query wirelessly in one or more outbound electronic signals to a first intermediate device. For example, the processor 180 can send the search query via the transceiver 188. The search query may be sent to an intermediate device using a unicast message, or may be sent to multiple devices, e.g., by sending multiple unicast messages, and/or by broadcasting and/or multicasting the search query. Continuing the example, the controller 60 may broadcast the search query which may be received by the refrigerator 251, the family room TV 253, the new device 255, and Meghna's car 254. While in FIG. 8, Ju-Yong's phone 252 may be within communication range of the central controller 60, Ju-Yong's phone may not have a radio type used by the controller 60 to send the search query. Alternatively, in another example, Ju-Yong's phone 252 may not be within communication range of the controller 60.

At stage 368, the method 360 includes receiving an inbound electronic signal wirelessly from the first intermediate device, the inbound electronic signal indicating a location of the target device. For example, the processor 180 may receive a signal indicative of the target device's location, e.g., from which a location may be determined, coordinates of the target device, location of the target device relative to an object or point, etc. The location of the target device may be a location of the target device relative to the first intermediate device. For example, the relative location may be a range from the first intermediate device, and may also include a direction from first intermediate device and the location of the first intermediate device. The location of the first intermediate device could be of any of a variety of resolutions such as global coordinates, local coordinates, a point-of-interest (e.g., the family room 66), a civic location, etc. Alternatively, the location of the target device could be a location relative to a map.

At stage 370, the method 360 includes providing an indication of the location of the target device through the user interface. For example, the processor 180 could provide, through the user interface 186, a visual (e.g., graphical and/or textual) and/or audible indication of the target device. Continuing the example, the processor 180 could provide a location of Ju-Yong's phone by displaying a graphical indication of the location on the map 250 along with a text reading "Ju-Yong's phone" or the equivalent. Also or alternatively, the processor 180 could provide an indication that "Ju-Yong's phone" is three feet from the family room TV." Still other indications could be provided.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, an indication that a device is configured to perform a stated function means that the device contains appropriate equipment (e.g., circuitry, mechanical device(s), hardware, software (e.g., processor-readable instructions), firmware, etc.) to perform the stated function. That is, the device contains equipment that is capable of performing the stated function, e.g., with the device itself having been designed and made to perform the function, or having been manufactured such that the device includes equipment that was designed and made to perform the function. An indication that processor-readable instructions are configured to cause a processor to perform functions means that the processor-readable instructions contain instructions that when executed by a processor (after compiling as appropriate) will result in the functions being performed.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, a wireless communication device may communicate through one or more wired connections as well as through one or more wireless connections.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A system comprising:
an interface; and
a processor communicatively coupled to the interface, the processor being configured to:
receive from the interface an object location request;
determine a search query based on the object location request and an association of the object location request with an entity, wherein the search query is a request for a location of a target device associated with the entity;
cause a transceiver of the interface to transmit the search query wirelessly in one or more outbound electronic signals to a first intermediate device;
receive one or more inbound electronic signals from the first intermediate device via the interface, the one or more inbound electronic signals including the location of the target device; and
cause the interface to provide an indication of the location of the target device to indicate the location of the target device relative to the first intermediate device.

2. The system of claim 1, wherein the processor is configured to cause the interface to provide the indication of the location of the target device to indicate the location of the target device relative to a map.

3. The system of claim 1, wherein the processor is further configured to determine the entity using voice recognition on the object location request.

4. The system of claim 1, wherein the processor is further configured to cause the interface to provide a prompt for the one or more search criteria.

5. The system of claim 4, wherein the processor is configured to:
cause a user interface of the interface to provide the prompt for one or more search criteria; and
cause the user interface to provide the indication of the location of the target device.

6. A system comprising:
means for receiving an object location request;
means for determining a search query based on the object location request and an association of the object location request with an entity, wherein the search query is a request for a location of a target device associated with the entity;
means for transmitting the search query wirelessly in one or more outbound electronic signals to a first intermediate device;
means for receiving one or more inbound electronic signals from the first intermediate device, the one or more inbound electronic signals including the location of the target device; and
means for providing an indication of the location of the target device to indicate the location of the target device relative to the first intermediate device.

7. The system of claim 6, wherein the means for providing the indication of the location of the target device include means for providing the indication of the location of the target device to indicate the location of the target device relative to a map.

8. The system of claim 6, further comprising means for determining the entity by performing voice recognition on the object location request.

9. The system of claim 6, further comprising means for providing a prompt for the one or more search criteria.

10. The system of claim 9, wherein the means for providing the prompt for the one or more search criteria comprise means for providing the prompt for the one or more search criteria via a user interface, and wherein the means for providing the indication of the location of the target device comprise means for providing the indication of the location of the target device via the user interface.

11. A method of locating a target device, the method comprising:
receiving an object location request;
determining a search query based on the object location request and an association of the object location request with an entity, wherein the search query is for locating the target device wherein the target device is associated with the entity;
transmitting the search query wirelessly in one or more outbound electronic signals to a first intermediate device;
receiving one or more inbound electronic signals wirelessly from the first intermediate device, the one or more inbound electronic signals including a location of the target device; and
providing an indication of the location of the target device to indicate the location of the target device relative to the first intermediate device.

12. The method of claim 11, wherein the indication of the location of the target device indicates the location of the target device relative to a map.

13. The method of claim 11, further comprising determining the entity by performing voice recognition on the object location request.

14. The method of claim 11, wherein transmitting the search query wirelessly in one or more outbound electronic signals to the first intermediate device includes transmitting the search query to a second intermediate device.

15. The method of claim 11, wherein the object location request is received via a user interface and the indication of the location of the target device is provided by the user interface.

16. The method of claim 15, further comprising providing a prompt for the object location request via the user interface.

17. A non-transitory storage medium comprising processor-readable instructions configured to cause a processor, in order to help locate a target device, to:
   receive an object location request;
   determine a search query based on the object location request and an association of the object location request with an entity, wherein the search query is for locating the target device and wherein the target device is associated with the entity;
   transmit the search query wirelessly in one or more outbound electronic signals to a first intermediate device;
   receive one or more inbound electronic signals wirelessly from the first intermediate device, the one or more inbound electronic signals including a location of the target device; and
   provide an indication of the location of the target device to indicate the location of the target device relative to the first intermediate device.

18. The storage medium of claim 17, wherein the indication of the location of the target device indicates the location of the target device relative to a map.

19. The storage medium of claim 17, wherein the processor-readable instructions comprise processor-readable instructions configured to cause the processor to determine the entity by performing voice recognition on the object location request.

20. The storage medium of claim 17, wherein the processor-readable instructions configured to cause the processor to transmit the search query wirelessly in one or more outbound electronic signals to the first intermediate device include processor-readable instructions configured to cause the processor to transmit the search query to a second intermediate device.

21. The storage medium of claim 17, wherein the processor-readable instructions configured to cause the processor to provide the indication of the location of the target device include processor-readable instructions configured to cause the processor to provide the indication of the location of the target device by a user interface.

22. The storage medium of claim 21, further comprising processor-readable instructions configured to cause the processor to provide a prompt for the object location request via the user interface.

* * * * *